US009679005B2

(12) United States Patent
Spalka et al.

(10) Patent No.: US 9,679,005 B2
(45) Date of Patent: Jun. 13, 2017

(54) CLIENT COMPUTER FOR QUERYING A DATABASE STORED ON A SERVER VIA A NETWORK

(71) Applicant: COMPUGROUP MEDICAL SE, Koblenz (DE)

(72) Inventors: Adrian Spalka, Koblenz (DE); Jan Lehnhardt, Koblenz (DE)

(73) Assignee: COMPUGROUP MEDICAL SE, Koblenz (DE)

( * ) Notice: Subject to any disclaimer, the term of this patent is extended or adjusted under 35 U.S.C. 154(b) by 0 days.

(21) Appl. No.: 14/955,212

(22) Filed: Dec. 1, 2015

(65) Prior Publication Data

US 2016/0253367 A1    Sep. 1, 2016

Related U.S. Application Data

(62) Division of application No. 14/495,984, filed on Sep. 25, 2014, now Pat. No. 9,235,725.

(30) Foreign Application Priority Data

Sep. 27, 2013 (EP) .................................. 13186390

(51) Int. Cl.
*G06F 21/62* (2013.01)
*G06F 17/30* (2006.01)
(Continued)

(52) U.S. Cl.
CPC .. *G06F 17/30365* (2013.01); *G06F 17/30283* (2013.01); *G06F 17/30345* (2013.01);
(Continued)

(58) Field of Classification Search
CPC .......... G06F 21/6218; G06F 17/30345; G06F 17/30365; G06F 17/30389; G06F 21/6227;
(Continued)

(56) References Cited

U.S. PATENT DOCUMENTS 6,225,546 B1   5/2001   Kraft et al.
6,785,810 B1   8/2004   Lirov et al.
(Continued)

FOREIGN PATENT DOCUMENTS

EP   1193585 A2   4/2002
EP   2731045 A1   5/2014

OTHER PUBLICATIONS

Wang et al., Mar. 30, 2012, Proceedings IEEE INFOCOM "Achieving Usable and Privacy-assured Similarity Search over Outsourced Cloud Data" pp. 451-459.*
(Continued)

*Primary Examiner* — Theodore C. Parsons
*Assistant Examiner* — Thomas Ho

(57) ABSTRACT

The invention relates to a client computer for querying a database stored on a server via a network, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the client computer has installed thereon an application program, the application program being operational to:
  receiving a search request, the search request specifying an infix search expression, said expression comprising a first wildcard term on the left side of a search criterion and a second wildcard term on the right side of the search criterion,
  transforming the infix search expression into a prefix search expression by disregarding in the search request
(Continued)

the first wildcard term and maintaining the search criterion and the second wildcard term, determine a search interval by transforming the prefix search into a corresponding search interval, performing a prefix search by determining all the encrypted suffix items lying within the search interval, providing to the database a request for providing the one or more encrypted first data items being assigned via the first referential connection to the determined encrypted suffix items, receiving from the database the requested encrypted first data items and decrypting said received first data items.

5 Claims, 12 Drawing Sheets

(51) Int. Cl.
  *H04L 9/14* (2006.01)
  *G06F 21/34* (2013.01)
  *H04L 9/32* (2006.01)
  *H04L 29/06* (2006.01)
  *G06F 21/60* (2013.01)

(52) U.S. Cl.
  CPC .. *G06F 17/30389* (2013.01); *G06F 17/30864* (2013.01); *G06F 21/34* (2013.01); *G06F 21/602* (2013.01); *G06F 21/6218* (2013.01); *G06F 21/6227* (2013.01); *G06F 21/6245* (2013.01); *H04L 9/14* (2013.01); *H04L 9/3247* (2013.01); *H04L 63/0435* (2013.01); *H04L 63/0442* (2013.01); *H04L 63/0471* (2013.01); *F04C 2270/0421* (2013.01); *G06F 2221/2107* (2013.01); *G06F 2221/2115* (2013.01)

(58) Field of Classification Search
  CPC ..... G06F 2221/2115; G06F 2221/2107; H04L 9/14; F04C 2270/0421
  See application file for complete search history.

(56) References Cited

U.S. PATENT DOCUMENTS

| | | | |
|---|---|---|---|
| 7,711,719 | B1 | 5/2010 | Waldin et al. |
| 8,429,421 | B2* | 4/2013 | Chase ................ G06F 21/6227 380/277 |
| 8,626,749 | B1 | 1/2014 | Trepetin et al. |
| 8,958,552 | B2* | 2/2015 | Hattori .................... H04L 9/008 380/30 |
| 8,990,223 | B2* | 3/2015 | Melnychenko ..... G06F 17/3053 707/748 |
| 2002/0038421 | A1 | 3/2002 | Hamada |
| 2002/0104002 | A1* | 8/2002 | Nishizawa .......... H04L 63/0428 713/168 |
| 2004/0181679 | A1* | 9/2004 | Dettinger ............ H04L 63/0428 713/193 |
| 2005/0144470 | A1 | 6/2005 | Takashima et al. |
| 2007/0118731 | A1 | 5/2007 | Zizzi |
| 2008/0080718 | A1 | 4/2008 | Meijer et al. |
| 2008/0086488 | A1 | 4/2008 | Nomula et al. |
| 2009/0210414 | A1 | 8/2009 | Shinjo |
| 2010/0266132 | A1 | 10/2010 | Bablani et al. |
| 2010/0306221 | A1 | 12/2010 | Lokam et al. |
| 2011/0145593 | A1 | 6/2011 | Auradkar et al. |
| 2012/0159180 | A1* | 6/2012 | Chase ................ G06F 21/6227 713/183 |
| 2012/0297201 | A1* | 11/2012 | Matsuda ............ G06F 21/6245 713/189 |
| 2013/0067226 | A1 | 3/2013 | Kunde et al. |
| 2013/0191650 | A1 | 7/2013 | Balakrishnan et al. |
| 2014/0337417 | A1 | 11/2014 | Park et al. |
| 2015/0006577 | A1 | 1/2015 | Vu et al. |
| 2015/0095642 | A1 | 4/2015 | Spalka et al. |
| 2015/0106632 | A1* | 4/2015 | Karame ................ H04L 9/0894 713/193 |
| 2015/0195122 | A1 | 7/2015 | Dahlberg et al. |
| 2016/0321312 | A1 | 11/2016 | Spalka et al. |

OTHER PUBLICATIONS

Zhang, Y. et al., "A Secure Cipher Index Over Encrypted Character Data in Database," IEEE Proceedings of the 7th International Conference on Machine Learning and Cybernetics, Kunming; Jul. 12-15, 2008; pp. 1111-1116.

Office Action mailed Nov. 5, 2015 for corresponding EP Application No. 13186390.4, 5 pages.

Al-Sakran, H.O. et al., "Efficient Cryptographic Technique for Securing and Accessing Outsourced Data," (IJCSIS) International Journal of Computer Science and Information Security,vol. 9, No. 8, Aug. 2011, Management Information Systems Department King Saud University Riyadh, Saudi Arabia; 6 pages.

Song, D. et al.,"Practical Techniques for Searches on Encrypted Data", in Proc. of the 2000 IEEE Symposium on Security and Privacy (S&P 2000), 2000, 12 pages.

Wang et al., "Achieving Usable and Privacy Assured Similarity Search over Outsourced Cloud Data," IEEE INFOCOM, Aug. 12, 2012, pp. 451-459.

Jin Li et al., "Fuzzy Keyword Search over Encrypted Data in Cloud Computing," INFOCOM, 2010 Proceedings IEEE, IEEE, Piscataway, NJ, USA, (Mar. 14, 2010), ISBN 978-1-4244-5836-3, pp. 1-5, XP031675078 [I] 1-21.

Non-Final Office Action mailed Apr. 11, 2016 for U.S. Appl. No. 14/495,983, 31 pages.

Restriction Requirement mailed Feb. 17, 2016 for U.S. Appl. No. 14/495,983, 8 pages.

Final Office Action mailed Jul. 28, 2016 for U.S. Appl. No. 14/495,983, 29 pages.

Non-Final Office Action mailed Feb. 9, 2017 for U.S. Appl. No. 15/170,088, 17 pages.

European Search Report mailed Mar. 10, 2014 for corresponding EP Application No. EP 13186360, 9 pages.

European Search Report mailed Feb. 27, 2014 for corresponding EP Application No. 13186390, 9 pages.

Notice of Allowance mailed Mar. 16, 2017 for U.S Appl. No. 14/495,983, 15 pages.

* cited by examiner

CLIENT COMPUTER FOR QUERYING A DATABASE STORED ON A SERVER VIA A NETWORK

CROSS REFERENCE TO RELATED APPLICATION(S)

The present application is a divisional application of U.S. patent application Ser. No. 14/495,984, filed on Sep. 25, 2014, which claims priority to European Patent Application No. EP 13186390.4, filed on Sep. 27, 2013, the entirety of which are incorporated herein by reference.

The invention relates to a client computer for querying a database stored on a server via a network, a computer system comprising a client computer, a method of querying by a client computer a database stored on a server, a client computer for updating a database stored on a server, a method of updating by a client computer a database stored on a server and a computer program product.

Storage and retrieval of encrypted data items for which confidentiality needs to be preserved on a server computer is as such known from the prior art, such as from D. Song, D. Wagner and A. Perrig, "Practical Techniques for Searches on Encrypted Data", in Proc. of the 2000 IEEE Symposium on Security and Privacy (S&P 2000), 2000. And (IJCSIS) International Journal of Computer Science and Information Security, Vol. 9, No. 8, August 2011, Efficient Cryptographic Technique for Securing and Accessing Outsourced Data, Hasan Omar Al-Sakran, Fahad Bin, Muhayalrina Serguievskaia, Management Information Systems Department King Saud University Riyadh, Saudi Arabia.

It is an object of the present invention to provide an improved client computer for querying a database stored on a server via a network, computer system comprising a client computer, method of querying by a client computer a database stored on a server, client computer for updating a database comprised in a database stored on a server, method of updating by a client computer a database comprised in a database stored on a server and an improved computer program product.

The underlying problem of the invention is solved by the features laid down in the independent claims. Embodiments of the invention are given in the dependent claims.

Embodiments of the invention provide for a client computer for querying a database stored on a server via a network, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the client computer has installed thereon an application program, the application program being operational to:

receiving a search request, the search request specifying an infix search expression, said expression comprising a first wildcard term on the left side of a search criterion and a second wildcard term on the right side of the search criterion, transforming the infix search expression into a prefix search expression by disregarding in the search request the first wildcard term and maintaining the search criterion and the second wildcard term, determine a search interval by transforming the prefix search into a corresponding search interval, performing a prefix search by determining all the encrypted suffix items lying within the search interval, providing to the database a request for providing the one or more encrypted first data items being assigned via the first referential connection to the determined encrypted suffix items, receiving from the database the requested encrypted first data items and decrypting said received first data items.

Embodiments of the invention may have the advantage that a search for data items stored in the database is possible, even though the search specifies an infix search and even though the data items are stored encrypted in the database. The retrieval of the first data items from the database can be performed without any knowledge of the respective cryptographic key by the database. At no time, the database has to be aware of the first cryptographic key or the plain text content of the first data items. Thus, there is no risk of compromising the first data items at the database. Nevertheless, standard database techniques can be used for querying the database including usage of indexes. Therefore, the search and retrieval of first data items is quick. Further, the amount of data to be transmitted between the client computer and the database is limited to a minimum. For example, only standard queries and retrieved first data items may be transmitted between the client computer and the database. This may predestine the employment of the described computer system in a cloud computing environment with the database being part of the cloud.

Further, any communication between the client computer and the database is secure since it is encrypted by the first cryptographic key.

The above mentioned client computer makes use of the idea that instead of directly performing an infix search on the encrypted first data items, the encrypted first data items are associated with additional searchable information in the database, namely the encrypted suffix items.

A first data item has a number of symbols. An example of a first data item is a name like "Michael". A suffix item corresponds to a first data item having removed on its left side a number of its symbols. In the above example, a suffix item of "Michael" is "ichael" or "chael" or "hael" or "ael" or "el" or "l".

Throughout the invention, a prefix search on a search criterion is understood as a wildcard search with one or more wildcards (i.e. wildcard characters) on the right side of the search criterion. An example for the search criterion 'abc' is a prefix search with the wildcard '*', i.e. a search for 'abc*'.

Further, throughout the description a wildcard character represents a single character (symbol) or a string of characters. For example, the wildcard character "?" may be substituted for any one of the 36 characters (symbols), "A" through "Z" and "0" through "9". It may further be substituted by special characters like ?, %, $, -, ! etc. The asterisk pattern character '*' matches zero or more characters. Further, a wildcard may indicate a number of symbols allowed on the left side or right side of the search criterion.

The above method makes use of transforming the infix expression like "*abc*" into a prefix search expression, like "abc*" and determining a search interval that corresponds to said prefix search expression.

For example, the suffix items may form a lexicographically ordered set of data items. In this case, the search criterion may comprise one or more characters like "abc" followed by the wildcard term like '*'. Thus, the left interval boundary is given by the one or more characters and the right interval boundary is given by said one or more characters incremented lexicographically by one character. For example 'abc*' leads to the interval [abc, abd):={x∈Σ*| abc≤x<abd}, wherein Σ denotes all elements of the lexicographic alphabet.

Further, the interval is defined with respect to the encrypted suffix items, not the first data items. Since for each suffix item a first referential connection exists in the database assigning said suffix item to the at least one first data item comprising the suffix of said suffix item, an identification for a suffix item lying in the above mentioned interval may automatically satisfy the left part of the infix expression, in the above example "*abc".

In accordance with an embodiment of the invention, the suffix items form a partially ordered set in the database, the partial order being formed with respect to the suffix items in non-encrypted form, wherein performing the prefix search by determining all the suffix items lying within the search interval comprises determining the suffix item forming an interval boundary of the search interval by a) requesting a current encrypted suffix item from the database,
b) in response to said requesting of the current encrypted suffix item, receiving from the database the current encrypted suffix item,
c) decrypting the current encrypted suffix item for obtaining a current decrypted suffix item,
d) determining if the current decrypted suffix item lies within the search interval,
e) in case the current decrypted suffix item lies outside the search interval, providing a request for a new encrypted suffix item, wherein the request for the new encrypted suffix item comprises information that the new encrypted suffix item is to be retrieved from a position in the partial order preceding or succeeding the position of the current encrypted suffix item, depending if the interval boundary is preceding or succeeding the current decrypted suffix item with respect to the partial order, and in response to said provision of the request for the new encrypted suffix item, receiving the new encrypted suffix item,
f) repeating steps c)-e) with the new encrypted suffix item being the current encrypted suffix item in step c), until the current decrypted suffix item lies within the search interval,
g) providing a request for a new encrypted suffix item, wherein the request for the new encrypted suffix item comprises information that the new encrypted suffix item is to be retrieved from a position in the partial order preceding or succeeding the position of the current encrypted suffix item, depending if the interval boundary is preceding or succeeding the current decrypted suffix item with respect to the partial order, and in response to said provision of the request for the new encrypted suffix item, receiving the new encrypted suffix item,
h) decrypting the new encrypted suffix item for obtaining a new decrypted suffix item,
i) determining if the new decrypted suffix item lies outside the search interval, wherein in case the new decrypted suffix item lies outside the search interval, selecting the current decrypted suffix item as the suffix item forming the interval boundary of the search interval,
j) in case the new decrypted suffix item lies within the search interval, repeating steps g)-j) with the new encrypted suffix item being the current encrypted suffix item in step g).

The above mentioned steps a)-f) are performed in order to identify if any of the suffix items is lying within the interval boundaries. If this is the case, the subsequent steps g)-j) allow identifying the suffix data item which forms the interval boundary of said interval in the database. Preferably, in case in step g) the new encrypted suffix data item is unavailable, the application program is operable to select the current decrypted suffix item as the interval boundary of the search interval.

In the context of the present disclosure, a partially ordered set is understood as any set of data elements that formalizes the concept of an ordering, sequencing, or arrangement of the elements of a set. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes the other in the partial ordered set.

In accordance with an embodiment of the invention, the application program is further operational for performing steps a)-j) for the interval boundary of the search interval being one of the bound sides of the search interval, wherein the suffix item determined in step i) forms the first interval boundary and selecting the current encrypted suffix item that was determined to lie within the interval boundary in step f) as the current encrypted suffix item and performing steps g)-j) for the interval boundary of the search interval being the other bound side of the search interval, wherein the suffix item determined in step i) forms the second interval boundary.

First at all this may provide the suffix items which form the interval boundaries of the search interval. Second, since with the determination of the first interval boundary the start of the search interval is known, the determination of the second interval boundary may be quicker than by selecting an arbitrary start point with step a) and repeating steps a)-f) again in order to determine a current suffix item that lies within the interval.

In accordance with an embodiment of the invention, in case in step g) the new encrypted suffix item is unavailable, the application program is operable to select the current decrypted suffix item as the suffix item forming the interval boundary of the search interval. This may be relevant in case the current decrypted suffix item is a leaf node.

In accordance with a further embodiment of the invention, the application program is further operational for determining the suffix items lying in the search interval by providing the database instructions to recursively traverse the database in order with respect to the partial order starting from the suffix item forming the interval boundary.

Alternatively, the encrypted suffix items are annotated with elements of a linear order in the database, the linear order corresponding the order in which the encrypted suffix items are stored in the database with respect to the partial ordered set, wherein the application program is further operational for determining the suffix items lying in the search interval by providing the database instructions to retrieve the first element of the linear order annotated to the encrypted suffix item forming the first interval boundary and to retrieve the second element of the linear order annotated to the encrypted suffix item forming the second interval boundary, wherein the application program is further operational for providing the database instructions to determine all encrypted suffix items having annotated the elements of linear order in between the first element and the second element.

The latter option may have the advantage that in a fast and efficient manner all relevant suffix items can be retrieved from the database. Thus, a computational exertive recursive traversing of the individual encrypted suffix items in between the interval boundaries is avoided. Preferably, the elements are integers.

In accordance with an embodiment of the invention, the application program is further operable to provide the request for the encrypted suffix item to the database, wherein the request for the encrypted suffix item comprises information that the encrypted suffix item is to be retrieved by the database, and in response to said provision of the request for the encrypted suffix item, receiving the encrypted suffix item from the database. This ensures that for each new data item requested and required by the client the database is asked for a provision of said new data item. As a consequence, data items received by the client will most probably be actual versions of said data items.

In an alternative, in a further embodiment of the invention for each database in the set of the databases the application program is further operable to:
  determine if a requested encrypted suffix item is available in a memory assigned to the client,
  in case said requested encrypted suffix item is available in the memory, direct the request to said encrypted suffix item to the memory and in response receiving said requested encrypted suffix item from the memory,
  in case said requested encrypted suffix item is unavailable in the memory, direct the request to said encrypted suffix item to the database, and in response receive a set of encrypted suffix items from the database, said set of encrypted suffix items comprising the requested encrypted suffix item, wherein the encrypted suffix items are ordered in the set of encrypted suffix items according to the partial order, and store the set of encrypted suffix items in the memory.

This may have the advantage that a part of the suffix items is buffered or cached in the memory assigned to the client. The memory may be for example a hard disk of the client, a NAS (network attached storage) or a RAM memory of the client. This reduces the number of requests from the client to the database. Instead of only providing individual encrypted suffix items of a database to the client, the database may provide a set of multiple suffix items which preferable are provided in contiguous form as given by the partial order in said database. For example, 10 data items are provided once for performing step a) for the database. Thus, in order to determine the element forming the interval boundary in said database, the client may use multiple times the elements comprised in the received set of multiple suffix items without there in between contacting the database.

This may be advantageous in systems with high latency times. For example the client may be communicating with the database via a mobile telecommunication network. Such a network typically has a high data transmission speed but a rather slow response time (high latency time). Instead of having to wait for each request for a respective response from the database, the database may be contacted less frequently and it may instead provide more than a single data item as response. Multiple subsequent accesses to a memory assigned to the client will take less time than individually contacting the database multiple times.

For example, the request to said encrypted suffix item directed to the server comprises the number of suffix items to be provided in response by the server in the set of suffix items, wherein the application program is further operable to determine the number of suffix items in the set of suffix items by analyzing a performance of the network. The performance of the network may comprise the actual maximum achievable data throughput between the client and the database and/or a network latency when communicating between the database and the client.

In accordance with an embodiment of the invention, the suffix items form a partial ordered set in said database via a rooted tree, wherein the application program is operable to request in step a) as the current encrypted suffix item from the server the suffix item stored at the root of said tree. Preferably the tree is automatically balanced by the database such that the speed for determining the interval boundaries is maximized.

In accordance with an embodiment of the invention, each suffix item has assigned an offset value for each first data item being assigned to the suffix item via the first referential connection, the offset value describing the difference in the word length between the first data item and the assigned suffix item, wherein
  the search request is comprising an integer value denoting a number of symbols allowed on the left side of the search criterion,
  the request for providing the one or more encrypted first data items being assigned via the first referential connection to the determined encrypted suffix items comprises the request for providing the encrypted first data items being assigned via the first referential connection and having assigned an offset value matching the integer value.

This may have the advantage that the search request can be formulated more specific. This helps to limit the number of hits (identified relevant first data items). Thus, instead of just storing for each first data item the respective suffix items (encrypted) in the database, each suffix item has assigned an offset value for each first data item being assigned to the suffix item via the first referential connection. In the above example "Michael", the suffix item "chael" associated to "Michael" has assigned the offset value 2, since two symbols are missing on the left side of the suffix item.

It has to be noted that in the context of relational databases, a referential connection is a referential constraint between two tables. For example, a referential connection is a field in a relational table that matches a candidate key of another table. The referential connection can be used to cross-reference the tables. However, the disclosure is not limited to relational databases.

In accordance with an embodiment of the invention, the first cryptographic key is a symmetric or an asymmetric key and/or the suffix cryptographic key is a symmetric or an asymmetric key. The first and the suffix cryptographic key may be identical.

In accordance with an embodiment of the invention the data items are tuples or attribute values of an attribute. The above-described procedure can thus be applied either for tuples as a whole, or parts of tuples or to individual attribute values. It has to be noted here, that the description is not limited to single values of an attribute. An attribute may also comprise multiple elements like for example multiple numbers separated from each other by for example, commas, semicolons or even multiple Boolean operators.

Generally, a data item as understood herein is any data value of a data element of a set of elements like for example a tuple that comprises one or more data elements, such as a data value of a data field of a data record that has multiple data fields, within a database, such as a relational data-base, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items.

In accordance with an embodiment of the invention,
the database comprises a first relation, wherein the first relation comprises the first data items and the suffix items or
the database comprises a first relation and a suffix relation, wherein the first relation comprises the first data items and wherein the suffix relation comprises the suffix items.

Thus, the encrypted data may be stored in a single or in multiple different relations. Further, the first referential connection may comprise the offset value for each first data item being assigned to the suffix item via the first referential connection, wherein the first referential connection is comprised in the first relation, the suffix relation or a referential relation.

In accordance with an embodiment of the invention, the application program is operational for
receiving a content request from a requestor, the content request indicating one or more of the decrypted first data items,
providing information content associated with said requested and indicated decrypted first data items to the requestor,
wherein the database comprises second data items wherein preferably the database further comprises at least one second relation, wherein the second relation comprises the second data items, wherein the second data items are encrypted with at least one second cryptographic key, wherein a second referential connection exists assigning each encrypted first data item to at least one of the second data items stored encrypted in the database, wherein the information content is comprised in the second data items, wherein the application program is operable to request from the database the information content via the second referential connections of the requested and indicated encrypted first data items, wherein the application program is further operational for decrypting the received encrypted second data items.

This may permit to accelerate the handling of the data. The first data items can remain 'slim' by releasing the information content to the second data items. Thus, a search will be able to return quickly corresponding hits even in case of a multitude of said hits. Only upon specific selection of individual first data items (content request), the respective information content associated with said first data items is provided.

Thus, embodiments may for example use directly the information content as given by the decrypted data of the first data item. Alternatively or additionally, each first data item may 'point' to another second data item which comprises in encrypted form the information content. In the latter case, an advantage may be that the first data items may be kept limited to a rather small size since they only describe just as much as necessary in order to allow the identification of the first data items satisfying the interval boundaries. Any further data associated with the first data items may be stored in the second data items.

In accordance with an embodiment of the invention, the second cryptographic key and/or the first cryptographic key and/or the suffix cryptographic key are identical.

In accordance with an embodiment of the invention, an encrypted data item is given by the current encrypted suffix item or the first data item, wherein decrypting the encrypted data item comprises
creating a residual data item by removing a predefined data portion of the encrypted data item, wherein the predefined data portion is common for all of the encrypted data items and wherein the content of the predefined data portion is unique for each data item,
generating the cryptographic key required for decrypting the encrypted data item, for example the suffix cryptographic key, by combining the content of the removed predefined data part with a symmetric key common for all of the encrypted data items,
decrypting the residual data item with the generated cryptographic key for obtaining the decrypted data item.

Thus, each (suffix or first) data item is encrypted and accordingly decrypted with an individual key. Breaking the individual key for one data item may thus not automatically allow to use that key for decryption of all other data items. This may significantly enhance the security of the encrypted data items (i.e. the encrypted suffix items or the encrypted first data items).

Further, the seed value is appended to the residual data item. For example, the seed value may directly correspond to the above mentioned predefined data portion. Thus, together, the appended seed value and the residual data item form the 'encrypted search criterion' provided in the above mentioned request for determining the encrypted suffix item matching the encrypted search criterion.

For example, the seed value is a random value individually generated for each data item, or the seed value is a hash value of at least part of the non-encrypted data item.

In a further embodiment, the predefined manner is given by a predefined position and data size used to append the seed value to the encrypted data item.

In another aspect, the invention relates to a computer system comprising a client computer as described above, and a database stored on a server, the server being coupled to the client computer via the network, wherein the database comprises data items, wherein the data items (e.g. first data items and suffix items) are encrypted with a cryptographic key in the database.

In accordance with another embodiment of the invention, the database is a relational database.

In accordance with an embodiment of the invention, the client computer is a client computer of a set of multiple sets of client computers, each client computer having installed thereon the application program, the application program comprising client computer specific log-in information, wherein the system further comprises:
a database system, the database system comprising the database, the database system having a log-in component for logging-in the client computers, the database system being partitioned into multiple relational databases, each one of the databases being assigned to one set of the sets of client computers, each database storing encrypted data items, wherein the first data items are comprised in said data items, each data item being encrypted with a user or user-group specific cryptographic key, wherein the first cryptographic key corresponds to said user or user-group specific cryptographic key. the key identifier of the cryptographic key with which one of the data items is encrypted being stored in the database as an attribute of the one of the encrypted data items, the log-in component comprising assignment information indicative of the assignment of the databases to the set of client computers, each one of the application programs being operational to perform the steps of:

a) establishing a network session with the database system over the network, b) transmitting the client computer specific log-in information to the database system via the session, c) receiving the key and the key identifier by the client computer for use of the key by the client computer and without transmitting the key to the database system;

d) entry of a search criterion into the client computer, e) generating a database query using the search criterion and the key identifier, the key identifier limiting the query to encrypted data items that have an attribute matching the key identifier, f) in response to the query, receiving at least one encrypted data item matching the search criterion from the database system, g) decrypting the encrypted data item using the cryptographic key, the database system being operational to perform the steps of:

i) receiving the client computer specific log-in information via the session by the log-in component of the database system, ii) determining one of the databases of the database system that is assigned to the client computer on which the application program is installed using the assignment information, by the log-in component of the database system, iii) entering the query received from the application program via the session into the database that has been determined using the log-in information for processing the query by that database.

Thus, embodiments of the invention may further provide for a computer system that has multiple sets of client computers. Each set of client computers may belong to a separate organizational entity, such as a separate health service provider, and be located in a separate access restricted environment, such as a medical practice or hospital. Access restriction to the environment can be implemented by physical, such as edificial, and/or organizational measures and/or by an electronic access control system. For example, the entrance door of a medical practice has an electronic lock that can be unlocked by presenting a security token of an authorized user that belongs to the medical practice, such as one of the health professionals or an assistant. During the opening hours of the medical practice access control can be performed by the receptionist of the medical practice.

It is important to note that the access restricted environment in which a set of client computers is located is a trusted environment in which confidentiality of data items, such as patients' medical records, is preserved.

In accordance with embodiments of the invention some or all of the client computers are located outside an access protected enclosed trusted environment. For example, at least some of the client computers are portable electronic telecommunication devices, such as mobile radios or digital cellular mobile telephones, such as smartphones or tablet computers that have a telecommunication interface, such as a GSM, UMTS, WLAN or other network interface.

This is particularly beneficial for applications that involve terrestrial users in vehicles or on foot, such as for emergency responder organizations or public works organizations. In the field of the provision of healthcare services this is particularly beneficial as it enables the use of a mobile portable battery powered client device in the context of emergency medical services and/or home visits of patients by medical doctors.

The cryptographic key and key identifier that is stored in one of the security tokens is specific to the authorized user such that a data item that is inserted into the database upon a respective entry of the data item by that user is encrypted with that user's cryptographic key and can only be retrieved and decrypted by the same user as the user needs to present the security token for the retrieval and decryption operation. Alternatively the user has to memorize the cryptographic key and its key identifier for entry into the respective client computer. As a further alternative the user has to memorize a credential, such as a username/password combination, for entry into the client computer. When the client computer receives the credential from the user it derives the cryptographic key assigned to the user and the respective key identifier using a predefined deterministic algorithm. For example, a predefined function can be utilized for deriving a symmetric key from the user credential. For deriving an asymmetric key pair a method disclosed in U.S. Pat. No. 8,266,435 B2 which is incorporated herein in its entirety can be utilized whereby the credential from which the asymmetric key pair is derived comprises a unique user ID and an arbitrarily selectable user ID.

A "cryptographic key" as understood herein encompasses a symmetric key that serves both for encryption and decryption as well as an asymmetric cryptographic key pair, where the public key is used for encryption and the private key is used for decryption.

A "key identifier" as understood herein encompasses an identifier of a symmetric key or an identifier that identifies an asymmetric cryptographic key pair.

Alternatively the cryptographic keys and key identifiers stored on the security tokens are not user but user-group specific. For example all authorized users of the same set of client computers, i.e. users belonging to the same organizational entity, share a common cryptographic key and key identifier that is specific to that user-group. As a further alternative user-groups within a given organizational entity that share the same set of client computers can be defined for database access rights management such that the users of such defined groups within the organizational entity share a common cryptographic key and key identifier.

In accordance with an embodiment of the invention the cryptographic key and its key identifier of a given user enables the user to access further cryptographic keys and their respective key identifiers. This is accomplished by storing such additional cryptographic keys in encrypted form on the database system together with the respective key identifiers.

Upon entry of the user's cryptographic key and key identifier into the client computer the key identifier is sent from the client computer to the database system. In response to receipt of the key identifier the database system returns the set of encrypted cryptographic keys that are assigned to the received key identifier such that the client computer can decrypt that additional set of cryptographic keys using the key that the user has entered. When a query is performed one or more of the additional key identifiers can be used as alternative or additional search criteria in order to include data items into the search that can be decrypted by one of the cryptographic keys that are available on the client computer.

In accordance with embodiments of the invention the application program is operational for generating an electronic signature for the encrypted data item and/or the key identifier. The database system is operational for checking the validity of the electronic signature and for executing the database insert command only if the electronic signature is valid. This provides an additional level of security against sabotage.

In accordance with alternative embodiment of the invention the application program is operational for generating an electronic signature for the unencrypted data item and/or the key identifier. The database system is not operational for checking the validity of the electronic signature, as it has no access to the unencrypted data item, and executes the database insert command without checking the validity of the electronic signature. The checking of the validity of the electronic signature is performed by the application program after retrieval and decryption of the data item. This also provides an additional level of security against sabotage.

In accordance with embodiments of the invention each set of client computers belongs to or constitutes a trusted entity and each set of client computers has its own dedicated set of users that are authorized with respect to that set of client computers. It is important to note that each entity as such is trusted and maintains the confidentiality of its own data items but that such trust does not exist between the various entities such that each one of the entities is prevented access to data items of another one of the entities.

In accordance with embodiments of the invention the database system is coupled to all sets of client computers via a network, such as a public network, in particular the Internet. The database system has a log-in component for logging-in the client computers.

A log-in component' of the database system is understood herein as encompassing any component of the database system for receiving authentication information, such as a username and password combination, and for establishing a database connection upon successful authentication. For example, upon receipt of a log-in command by the database system, the database system requests entry of the authentication information and establishes the database connection if the authentication information is correct.

It is important to note that the authentication information, i.e. the log-in information, is not user-specific in accordance with an embodiment of the present invention but it is client computer specific as the log-in information forms an integral part of the application program that is installed on any one of the client computers.

Providing the application programs with client computer specific log-in information rather than log-in information that is specific to the trusted environment has the advantage that removal or loss of one of the client computers from the trusted environment does not require to replace the log-in information in all of the remaining client computers within that trusted environment. Further, another advantage is that the assignment information used by the log-in component of the database system does only need to be updated by deleting the log-in information of the removed or lost client computer without a need to change the assignment information otherwise.

After a session via the network has been established between the application program and the database system, such as an internet session, the application program sends a log-in command to the database system in response to which the database system prompts the application program for sending the log-in information. In response, the application program reads the log-in information and sends the log-in information to the database system for checking and for establishing the database connection with one of the databases. It is important to note that such a log-in operation can be executed without the user's interaction as the user does not need to enter log-in information as the log-in information is client computer specific and forms an integral part of the application program. Hence a standard log-in function provided by the database system, such as a MySQL log-in function, is used not for logging in a user but for logging in the client computer on which the application program that comprises the log-in information is installed.

In accordance with embodiments of the invention the database system is partitioned into multiple databases where each one of the databases is assigned to one set of the sets of client computers. In other words, the database system comprises multiple databases and there is a one-to-one relationship between sets of client computers and databases. This serves as a protection of a database that is assigned to one of the sets of client computers from attacks, such as denial of service attacks, from one of the other sets of client computers and it limits the risk against sabotage, the infiltration of computer viruses and other malicious software to the individual databases while limiting the risk of spreading from one database to another.

The assignment of sets of client computers to databases is implemented by assignment information that is indicative of these assignments and which is accessible by the log-in component. The log-in component uses the authentication information, i.e. the log-in information, that it receives from a client computer for retrieval of the assignment of that client computer and thus the set to which it belongs to one of the databases. A database connection is then established between the application program of that client computer and the assigned database provided the log-in is successfully completed.

Each one of the databases stores encrypted data items whereby the encryption is performed with one of the user or user-group specific cryptographic keys of the security tokens. Each one of the encrypted data items is stored in conjunction with the key identifier, but not the key itself, that was used for encryption of the data item as an attribute. This facilitates to limit the search in the database for retrieval of an encrypted data item to such data items that have been encrypted by a given cryptographic key.

In accordance with embodiments of the invention a database query is generated by encrypting a search criterion with the entered key by the application program. The search can thus be executed by the respective database in the encrypted domain.

In addition to the search criterion that is entered by the user the query is limited by the key identifier of the entered key, such that the database system only returns encrypted data items that not only match the encrypted search criterion but also the key identifier. This way the set of database hits that are returned in response to the query is limited to encrypted data items that have been encrypted with the key that is identified by the key identifier. This reduces the network load and avoids unnecessary data processing operations by the client computer, such as for attempting to decrypt and/or verify a encrypted data item that can in fact not be decrypted by the client computer.

In accordance with embodiments of the invention the client computers also have log-in components for providing an additional level of security. The client log-in components serve for logging in a user by means of user specific authorization information, such as a username/password combination and/or biometric user information. After user log-in into one of the client computers the user may start the application program that is installed on that client computer whereupon the user is prompted to present his or her security token.

The application program may then send an access command, such as a chip card command in the form of an APDU, to the security token for reading the cryptographic key and the key identifier stored on that security token of the user. The user must first authenticate against the security token in order to enable such a read access by the application program. This way it is ensured that the security token that is presented by the user is in fact the security token of that user.

After performance of the client computer specific log-in into the database system and the establishment of the database connection the user may perform multiple queries or insert data items while the cryptographic key and key identifier are stored in the working memory of the client computer. The cryptographic key and key identifier are automatically erased from the memory of the client computer and no copy is retained by the client computer when one of the following events occurs
- a time-out condition is fulfilled, e.g. a predefined time period of user inaction with respect to the application program has occurred,
- the database connection and/or the network session is interrupted,
- the application program is closed by the user or automatically by logging out the user,
- the power supply of the client computer is interrupted.

This can be implemented e.g. by the log-in component of the client computer or by the application program. This has the advantage that the user needs to present his or her security token only once after each log-in for ease of use of the system while a high level of security is maintained due to the fact that the cryptographic key that has been read in from the security token is automatically erased when the user is logged out.

In accordance with embodiments of the invention each client computer has a client log-in component for logging-in a user into the respective client computer upon receiving authentication information from that user, such as a username/password combination and/or biometric information, wherein the cryptographic key and the key identifier is entered into the client computer after logging-in that user and stored in the client computer until the user is logged-out. For example, the user is prompted to enter his or her cryptographic key and key identifier by the application program that is started after the user has logged in into the client computer.

In accordance with embodiments of the application the client computer specific log-in information of a client computer is stored in a configuration file of the application program that is installed on that client computer, such as an INI file, a registry or an XML.config file of the application program.

In accordance with embodiments of the invention each security token has a secure memory area in which a private key of an asymmetric cryptographic key pair assigned to that security token and its user is stored. Further, the security token has a processor for generating an electronic signature using that private key. Such an electronic signature is also referred to as a digital signature. For insertion of a data item into the respective database a signature of that data item is generated using the security token and stored in the database together with the encrypted data item. When the encrypted data item is retrieved at a later point of time by the same user or a user that belongs to the same user-group the validity of that signature can be checked by the application program after decryption of the data item.

Embodiments of the invention may be particularly advantageous as they may enable the efficient and secure storage of confidential data, such as medical records, in the cloud. The term 'cloud' as understood herein encompasses any database system that is accessible via a network, such as the Internet, and that is outside the control and responsibility of the organizational entities, such as health service providers, that utilize that database system. Embodiments of the invention are particularly advantageous as the storage of confidential data, such as medical records, in the cloud, i.e. a third party storage system or network, is enabled while fulfilling all regulatory requirements as to the maintenance of confidentiality. In particular, the third party that operates the database system does not need to be a trusted entity in terms of maintenance of confidentiality, authenticity and integrity of the data.

In accordance with another embodiment of the invention, the application program is comprising client computer specific log-in information, wherein the client computer further comprises:
- a communication interface for receiving a user or user-group specific key and a key identifier of that cryptographic key, wherein the first cryptographic key is corresponding to such a user or user-group specific key, the communication interface being operational for manual entry of user information specifying the user or user-group specific key and a key identifier and/or for communication with one security token (STik) of a set of security tokens, the security token being assigned to one authorized user, a user or user-group specific key and a key identifier of that cryptographic key being stored on the security token,
- a network communication interface for communication with a database system comprising the database, the application program being operational to perform the following steps for writing the first data item to the database system:
- entry of the first data item into the client computer,
- encrypting the first data item with the key that has been entered into the client computer,
- generating a database insert command, the insert command comprising the encrypted first data item and the key identifier of the key with which the first data item has been encrypted as an attribute of the encrypted data item for storing the encrypted first data item in the database system with the key identifier as an attribute,
- establishing a session with the database system over the network by the network communication interface,
- transmitting the insert command via the session to the database system for processing by the one of the databases that has been determined to be assigned to the client computer by the log-in component such that the encrypted first data item with the key identifier is stored in that database, the application program being operational to perform the following steps for reading the first data item:
- establishing a session with the database system over the network,
- transmitting the client computer specific log-in information to the database system via the session,
- entry of the key and the key identifier from one of the security tokens into the client computer for use of the key by the client computer and without transmitting the key to the database system;
- entry of a search criterion into the client computer, generating a database query using the search criterion and the key identifier, the key identifier limiting the query to encrypted data items that have an attribute matching the key identifier, in response to the query, receiving an encrypted first data item matching the search criterion from the database system, decrypting the encrypted data item using the cryptographic key.

In accordance with embodiments of the invention the cryptographic key or the cryptographic keys that are stored on a client computer for encryption and/or decryption of data items are automatically erased from the memory of that client computer if the user closes the application program running on that client computer, the user is logged off by the operating system of the client computer, such as when a timeout condition is fulfilled due to an extended phase of user inaction, and/or when the power supply is switched off or becomes unavailable, such as when the client computer is switched off or the storage capacity of the battery that powers the client computer is exhausted. Preferably, the at least one cryptographic key for the encryption and/or decryption of the data items is stored in volatile memory of the client computer such that it is ensured that the at least one key is erased when the power supply is switched off or becomes unavailable, such as when the client computer is a mobile battery powered device and its batteries become exhausted.

Automatically erasing the at least one key from the memory of the client computer is particularly beneficial if the client computer is utilized outside the trusted environment, such as for terrestrial use in vehicles or on foot. In such a situation it may occur that a user leaves his or her client computer unattended. Automatically erasing the at least one key from the client computer such as when a timeout condition is fulfilled provides an additional level of security. Even if an unauthorized party gets into the possession of the client computer which has been lost by an authorized user or that was stolen the unauthorized party cannot access or decrypt the encrypted data items that are stored on the database system if the key has been erased from the memory of that client computer before the unauthorized party gets into the possession.

In accordance with further embodiments of the invention the at least one key is erased from the memory of the client device in response to a respective command received from the user in order to enable another authorized user to utilize that client device while preventing access of to the data items of the previous user. This has the additional advantage of making a user log-in of the operating system, such as a Windows log-in, superfluous or unnecessary, as entering the cryptographic key that is assigned to one of the users for encryption and/or decryption of data items de facto also serves as a log-in credential for utilizing a given one of the client computers.

Embodiments of the invention are particularly advantageous as confidentiality, authenticity and integrity of the data items that are stored by the database system are maintained even though the database system may be under the control of an un-trusted third party. In addition, embodiments of the invention also provide protection against inter-customer vandalism by partitioning the database system into separate databases which are assigned to individual customers, i.e. organizational entities, such as health service providers.

Furthermore, embodiments of the present invention provide protection against unintentional erroneous data storage operations as well as against intentional sabotage, such as erasing data from one of the databases. This is accomplished by a database log that tracks database changes such that an earlier status of a database can be reconstructed from the database log.

In another aspect, the invention relates to method for querying a database stored on a server via a network, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the client computer has installed thereon an application program, wherein the method comprises at the client computer:

receiving a search request, the search request specifying an infix search expression, said expression comprising a first wildcard term on the left side of a search criterion and a second wildcard term on the right side of the search criterion, transforming the infix search into a prefix search by disregarding in the search request the first wildcard term and maintaining the search criterion and the second wildcard term, determine a search interval by transforming the prefix search into a corresponding search interval, performing a prefix search by determining all the encrypted suffix items lying within the search interval, providing to the database a request for providing the one or more encrypted first data items being assigned via the first referential connection to the determined encrypted suffix items, receiving from the database the requested encrypted first data items and decrypting said received first data items.

In another aspect, the invention relates to a client computer for updating a database stored on a server, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the client computer has installed thereon an application program, the application program being operational to perform the steps of a) receiving an update first data item, the update first data item comprising a set of successional symbols, b) creating an update suffix item by removing a number of the successional symbols from the left side of the update first data item, the update suffix item being the residual part of the update first data item without the removed symbols, c) encrypting the update suffix item with the suffix cryptographic key for obtaining an encrypted update suffix item and encrypting the update first data item with a first cryptographic key for obtaining an encrypted update first data item, d) providing a storage request to the database, the storage request comprising instructions to store in the database the encrypted update suffix item, the encrypted update first data item and a first referential connection assigning said encrypted update suffix item to the encrypted update first data item, e) repeating steps b)-d) with different numbers of the successionally removed symbols, the numbers being in between a minimum like zero and a maximum, wherein the maximum is given by the total number of symbols of the update first data item minus a predefined minimal word length.

This may allow for maintenance of the databases by updating the database with new data items. However, also the updating of the database can be performed without any knowledge of the respective cryptographic key by the database. For updating, the database has not to be aware of the first cryptographic key or the plain text content of the first data items. Further, it does not have to be aware of the suffix cryptographic key. Thus, there is no risk of compromising the first data items at the database. Any information relating to the decrypted content of the first and suffix items remains at the client.

In accordance with an embodiment of the invention, the suffix items form a partially ordered set for example in a first relation of the database, the partial order being formed with respect to the suffix items in non-encrypted form, the application program being operational to perform the steps of i. sequentially requesting and decrypting encrypted suffix items, wherein each request of the sequential requesting is performed by comparing the position of the update suffix item in the partial order with the position of the decrypted suffix items in the partial order, wherein the sequential requesting is performed until a position in the partial order for storing the update suffix item in the first relation is determined, ii. in case a position for storing the update suffix item in the database, e.g. in the first relation is determined, providing the storage request to the database, the storage request comprising the encrypted update suffix item and the position determined in step i).

Here, comparing the position in the partial order may be done by comparing the update suffix item to the decrypted suffix items and deciding whether to request a predecessor or a successor of the current decrypted suffix item. Further, the sequential requesting may be repeatedly performed until a position in the partial order is determined for storing the update suffix item in the database such that the order's consistency with respect to the partial order is still given after storing the update suffix item. The 'positions' of the suffix items are given by the partial order.

Thus, any decision where to store the update suffix items in the database is made only by the client. Thus, maintaining the partial order in the database when updating with new data items is done and ensured by the client.

In accordance with an embodiment of the invention, step i) comprises:

a) requesting a current encrypted suffix item from the database, b) in response to said requesting of the current encrypted suffix item, receiving from the database the current encrypted suffix item, c) decrypting the current encrypted suffix item for obtaining a current decrypted suffix item, d) in case the update suffix item is located at a position in the partial order preceding the current decrypted suffix item, providing a request for determining the availability of a new encrypted suffix item in the first relation immediately preceding the current encrypted suffix item, e) in case the update suffix item is located at a position in the partial order succeeding the current decrypted suffix item, providing a request for determining the availability of a new encrypted suffix item in the first relation immediately succeeding the current encrypted suffix item, f) in case the new encrypted suffix item is available in the first relation, requesting the new encrypted suffix item and in response to said requesting receiving the new encrypted suffix item, and repeating steps c)-f) with the current encrypted suffix item in step c) being the new encrypted suffix item, g) in case the new encrypted suffix item is unavailable in the first relation, encrypting the update suffix item with the first cryptographic key for obtaining an encrypted update suffix item and providing the storage request of step ii) to the server, the storage request comprising the encrypted update suffix item and a position information, the position information instructing the server to store the encrypted update suffix item in the database at a position in the partial order immediately preceding or succeeding the position of the current encrypted suffix item, depending if the update suffix item is preceding or succeeding the current decrypted suffix item with respect to the partial order.

In case of the suffix items forming a partial ordered set in the database via a rooted tree, said suffix items are ordered in the tree with the encrypted suffix items being described by nodes in various depths. In this case, it is well understood that requesting any encrypted suffix item preceding or succeeding a current encrypted suffix item corresponds to requesting a node describing an encrypted suffix item preceding or succeeding the node comprising the current encrypted suffix item at a depth of the tree which is larger by for example one level than the depth of the node of the current encrypted suffix item.

In accordance with an alternative embodiment of the invention, step i) comprises:

a) requesting a current encrypted suffix item from the database, b) in response to said requesting of the current encrypted suffix item, receiving from the database the current encrypted suffix item, c) decrypting the current encrypted suffix item for obtaining a current decrypted suffix item, d) providing a request for a new encrypted suffix item, wherein the request for the new encrypted suffix item comprises information that the new encrypted suffix item is to be retrieved from a position in the partial order immediately preceding or succeeding the position of the current encrypted suffix item, depending if the update suffix item is preceding or succeeding the current decrypted suffix item with respect to the partial order, and in response to said provision of the request for the new encrypted suffix item, receiving and decrypting the new encrypted suffix item, e) in case the update suffix item is not located at a position in the partial order between the position of the new decrypted suffix item and the current decrypted suffix item, repeating steps c)-d) with the new encrypted suffix item being the current encrypted suffix item in step c), until the update suffix item is located at a position in the partial order between the position of the new decrypted suffix item and the current decrypted suffix item, f) encrypting the update suffix item with the first cryptographic key for obtaining an encrypted update first data item, wherein step ii) comprises g) providing the storage request to the database, the storage request comprising the encrypted update suffix item and a position information, the position information instructing the database to store the encrypted update suffix item in the database at a position in the partial order between the new decrypted suffix item and the current decrypted suffix item.

In this case, the partial order is given for example by a linear order formed with respect to the suffix items in non-encrypted form.

In accordance with an embodiment of the invention, each suffix item has assigned at least one offset value, the offset value describing the difference in the word length between the at least one first data item and its suffix, wherein the first referential connection is assigning the offset value to the corresponding at least one first data item comprising the suffix at the offset value of said suffix item, wherein the storage request further comprises instructions to store the number of the successional symbols removed from the left side of the update first data item as the offset value with the encrypted update first data item, wherein in step i) the first referential connection is assigning said offset value to the encrypted update first data item.

It has to be noted that the offset value may be either stored in encrypted or in non-encrypted form for example in the database.

In accordance with an embodiment of the invention, the encrypted suffix items are annotated with elements of a linear order, the linear order corresponding to the order in which the encrypted suffix items are stored in the database with respect to the partial ordered set, wherein the storage request further comprises an instruction for the database to annotate the encrypted update suffix item with an element of the linear order having a value in between the element annotated to the new decrypted suffix item and the element annotated to the current decrypted suffix item.

In accordance with an embodiment of the invention, information content is associated with the update first data item, wherein the database further comprises second data items, wherein the second data items are encrypted with a second cryptographic key, wherein a second referential connection exists assigning each encrypted first data item to at least one of the second data items stored encrypted in the database, wherein further information content is comprised in the second data items, wherein the application program is further operable for encrypting the information content associated with the update first data item with the second cryptographic key, wherein the storage request further comprises an instruction to the database to store the encrypted information content associated with the update first data item in the database and to provide the update first data item stored encrypted in the database with a second referential connection to the encrypted information content associated with the update first data item in the database.

In accordance with an embodiment of the invention, a data item is given by the update first data item or the update suffix item, wherein the application program is further operational to determine for each data item the respective cryptographic key required for encrypting said data item by generating a seed value and combining the seed value with a symmetric key common for all of the data items, wherein the storage request comprises instructions to store in the database the data item (e.g. the encrypted update suffix item) with the seed value being appended to the encrypted data item, wherein the seed value being appended to the encrypted data item forms a storable encrypted data item, wherein the seed value is appended to the data suffix item in a predefined manner common for all data items.

For example, the seed value is a random value individually generated for each data item, or the seed value is a hash value of at least part of the non-encrypted data item.

In a further embodiment, the predefined manner is given by a predefined position and data size used to append the seed value to the encrypted data item.

As discussed above, this has the advantage, that every data item is individually encrypted which increases the security level of the data items.

In a demonstrative example, an encryption C of a data item DATA may result in the following:

Hash(DATA)+C(DATA,C(Hash(DATA),symmetric key)).

Here, Hash(DATA) corresponds to a Hash value of the data item DATA. C(a,b) corresponds to an encryption of a using key b. 'x+y' means that x is appended to y in a predefinded manner. For example, x may be prepended to y or x may be suffixed to y.

In another aspect, the invention relates to a method for updating a database comprised in a database stored on a server with an update first data item, the server being coupled to the client computer via a network, wherein the database comprises first data items, wherein the first data items are encrypted with a first cryptographic key in the database, wherein the first data items form a partially ordered set in the database, the partial order being formed with respect to the first data items in non-encrypted form, wherein the client computer has installed thereon an application program, the application program being operational for:

i. sequentially requesting and decrypting encrypted first data items, wherein each request of the sequential requesting is performed by comparing the position of the update first data item in the partial order with the position of the decrypted first data items in the partial order, wherein the sequential requesting is performed until a position in the partial order for storing the update first data item in the database is determined, ii. in case a position for storing the update first data item in the database is determined, providing a storage request to the database, the storage request comprising the encrypted update first data item and the position determined in step i).

In another aspect, the invention relates to a computer program product comprising computer executable instructions to perform the steps as described above.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer de-vice via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Small-talk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer pro-gram products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Within the context of the present invention, a database index is a data structure that improves the speed of data retrieval operations. Indices may be created using one or more columns of a database table, providing the basis for both rapid random lookups and efficient access of data items.

It is understood in advance that although this disclosure includes a detailed description on cloud computing in FIGS. 4 and 5, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

It is understood that one or more of the aforementioned embodiments of the invention may be combined as long as the combined embodiments are not mutually exclusive.

In the following, preferred embodiments of the invention are described in greater detail by way of example only using the following figures in which.

Figure 4:
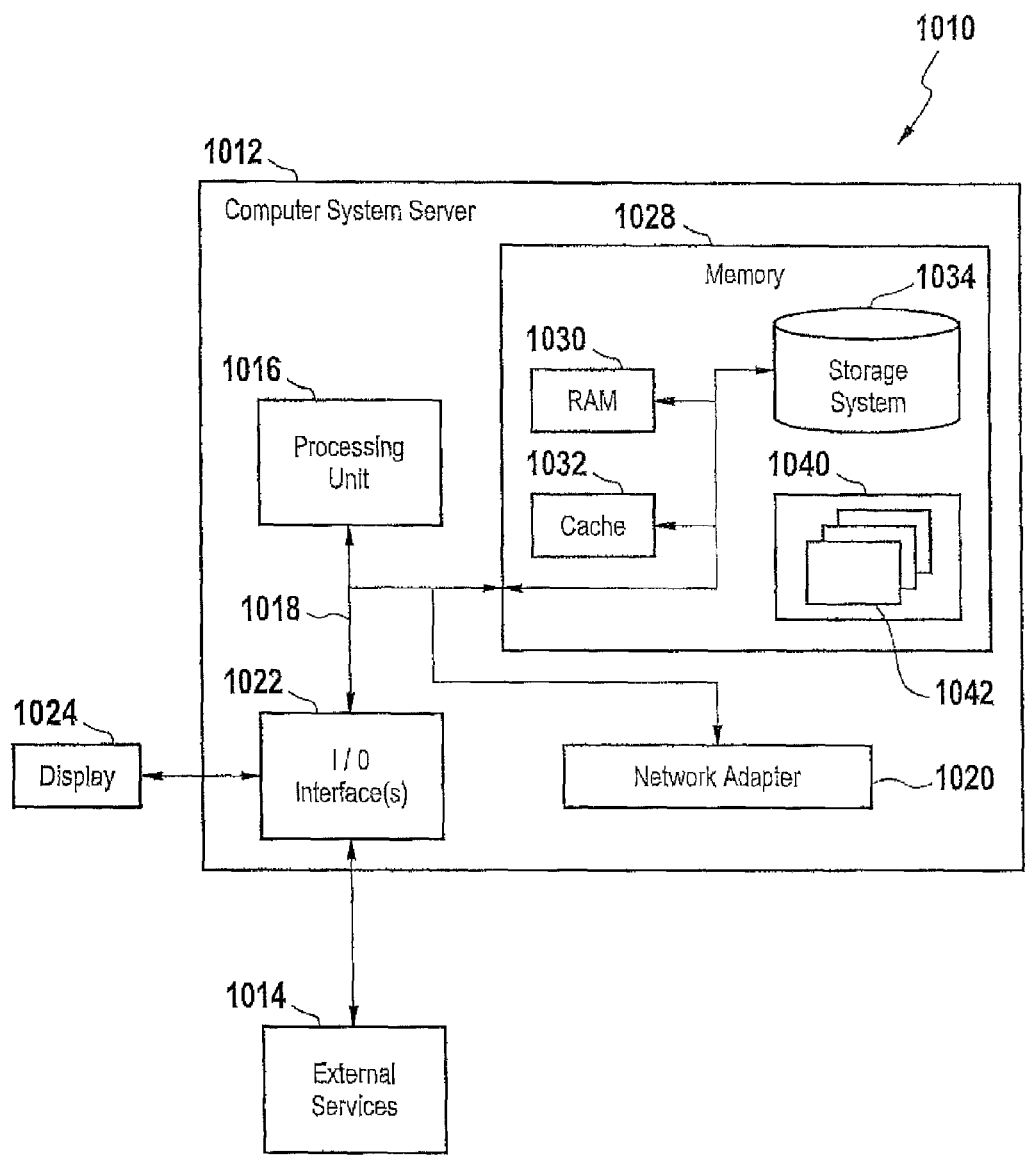
Figure 5:
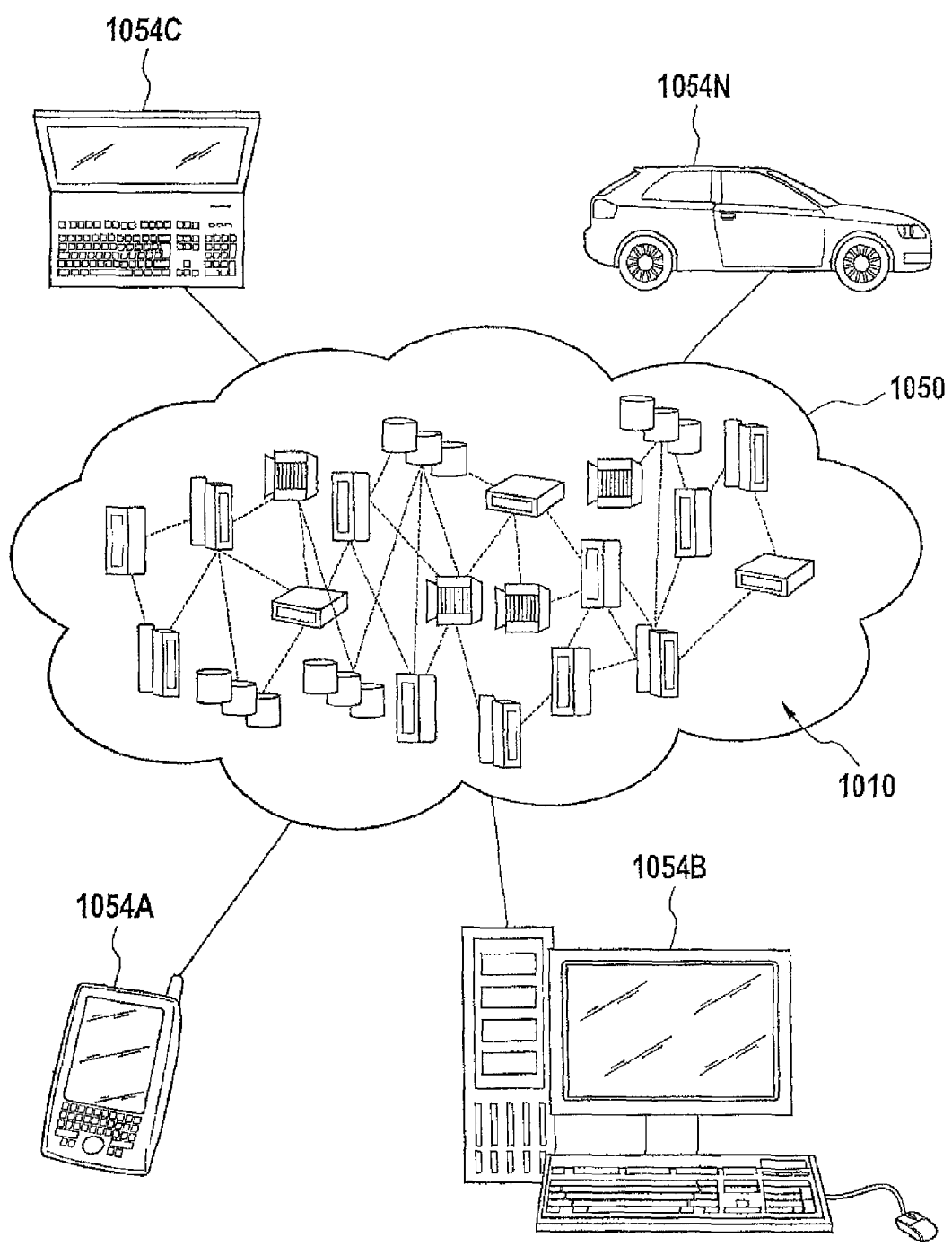
Figure 6:
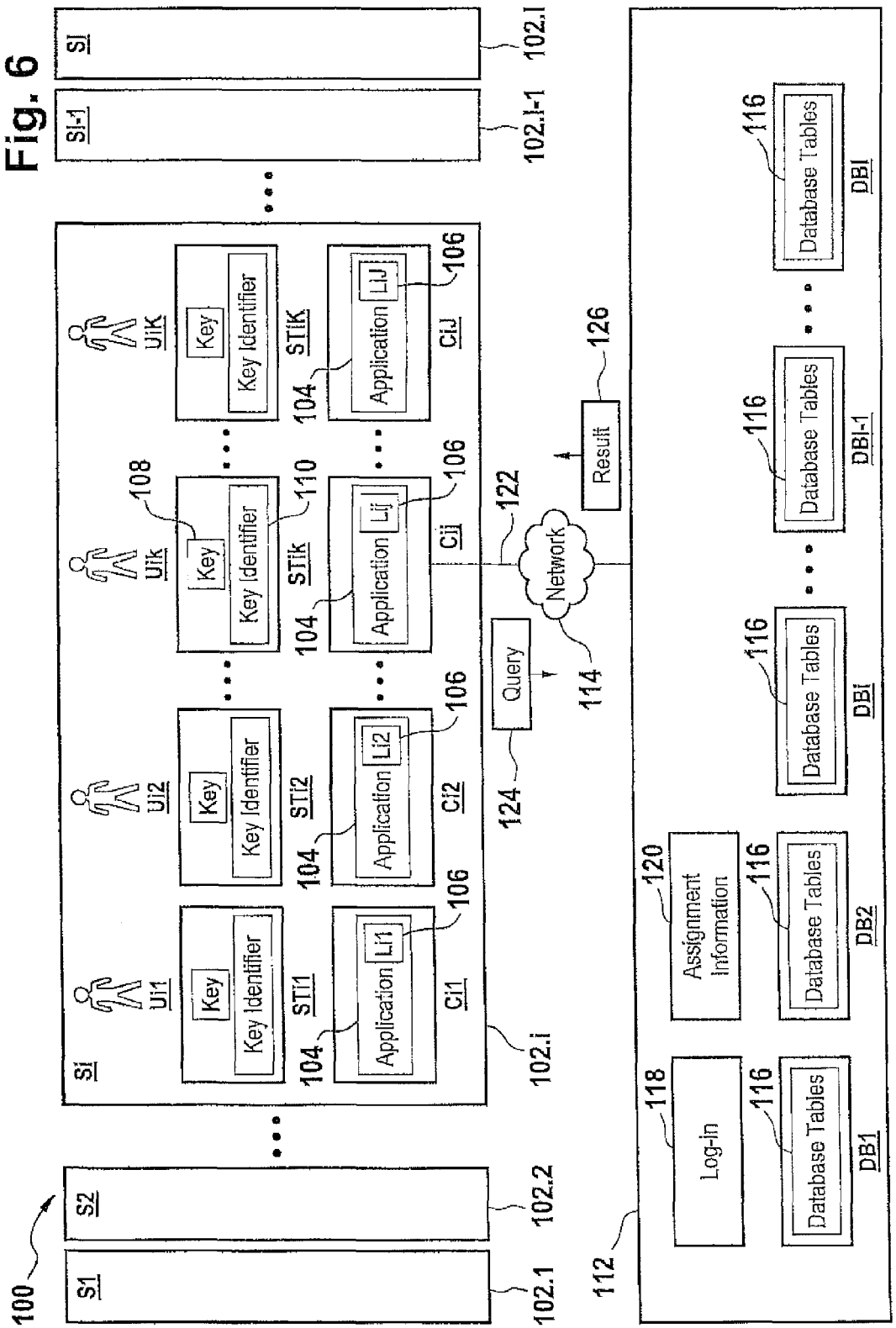
Figure 7:
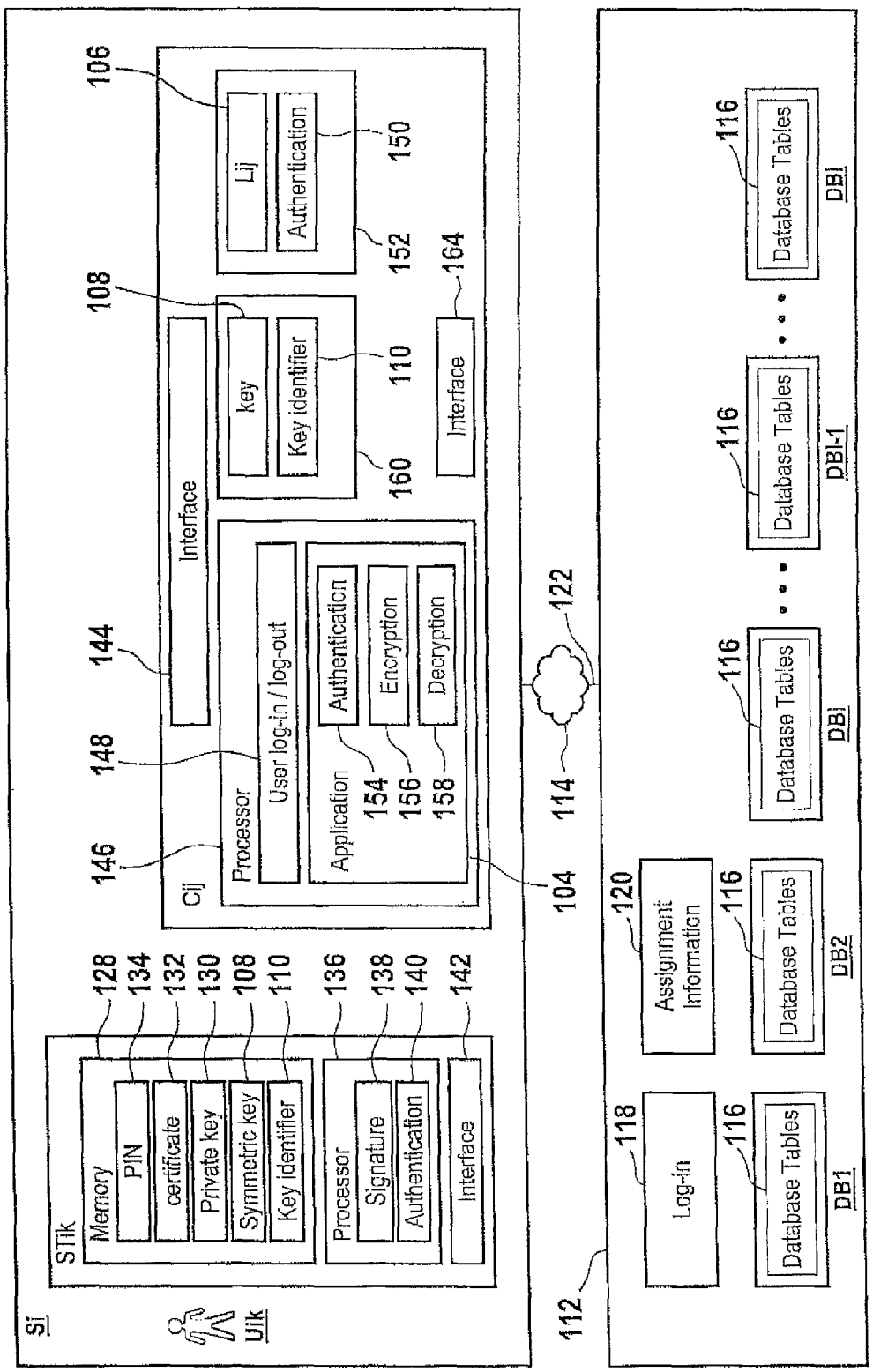
Figure 8:
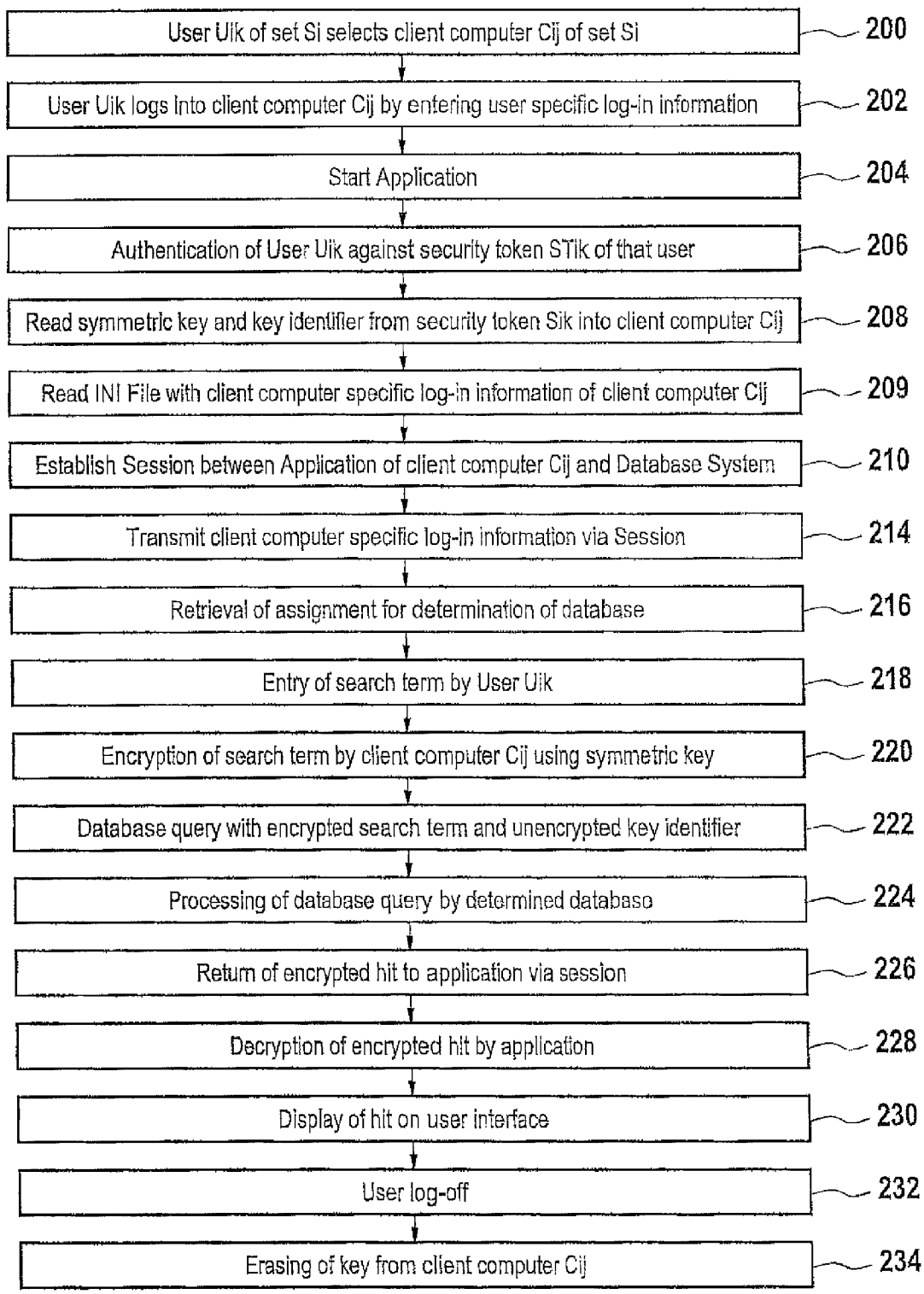
Figure 9:
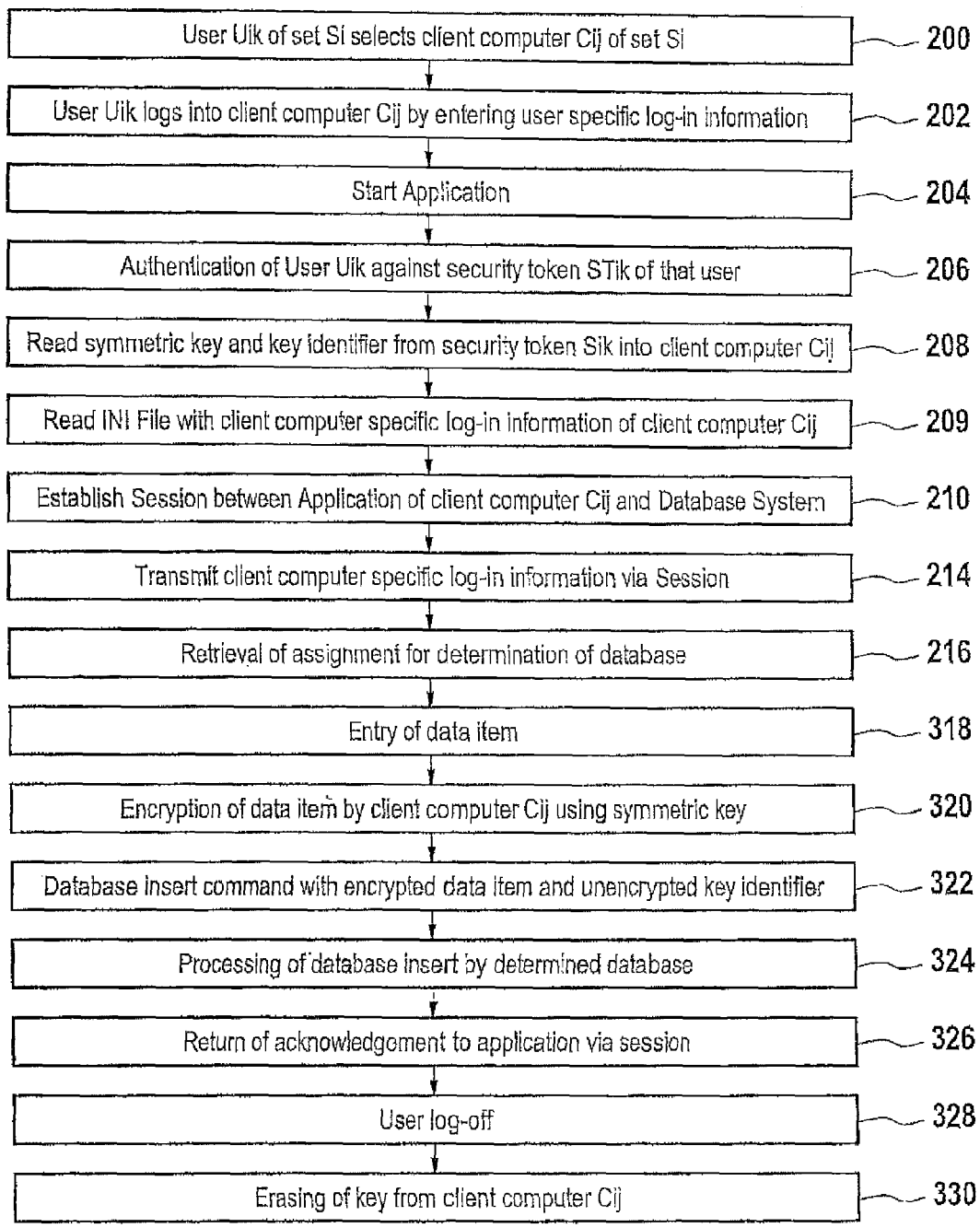
Figure 10:
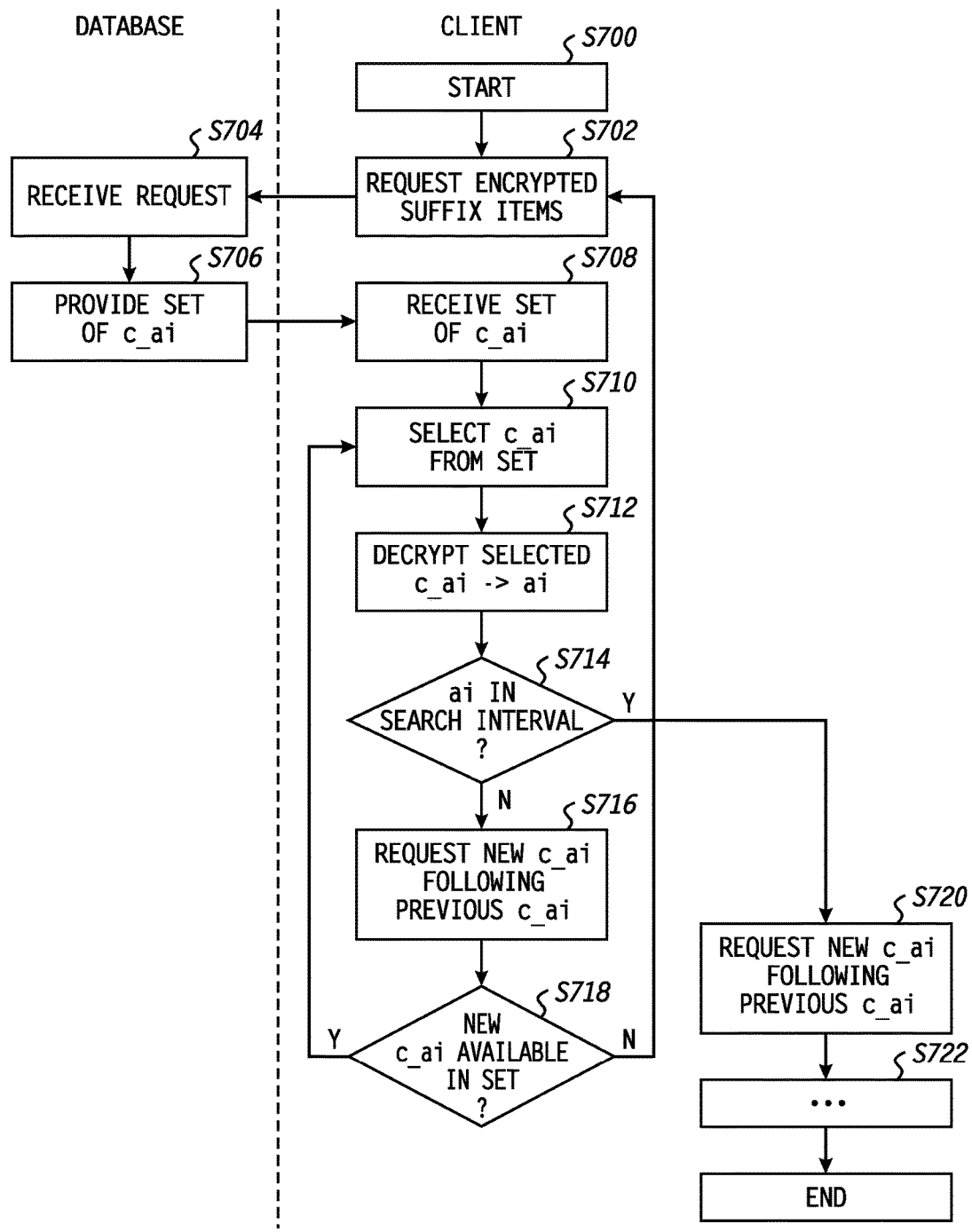
Figure 11:
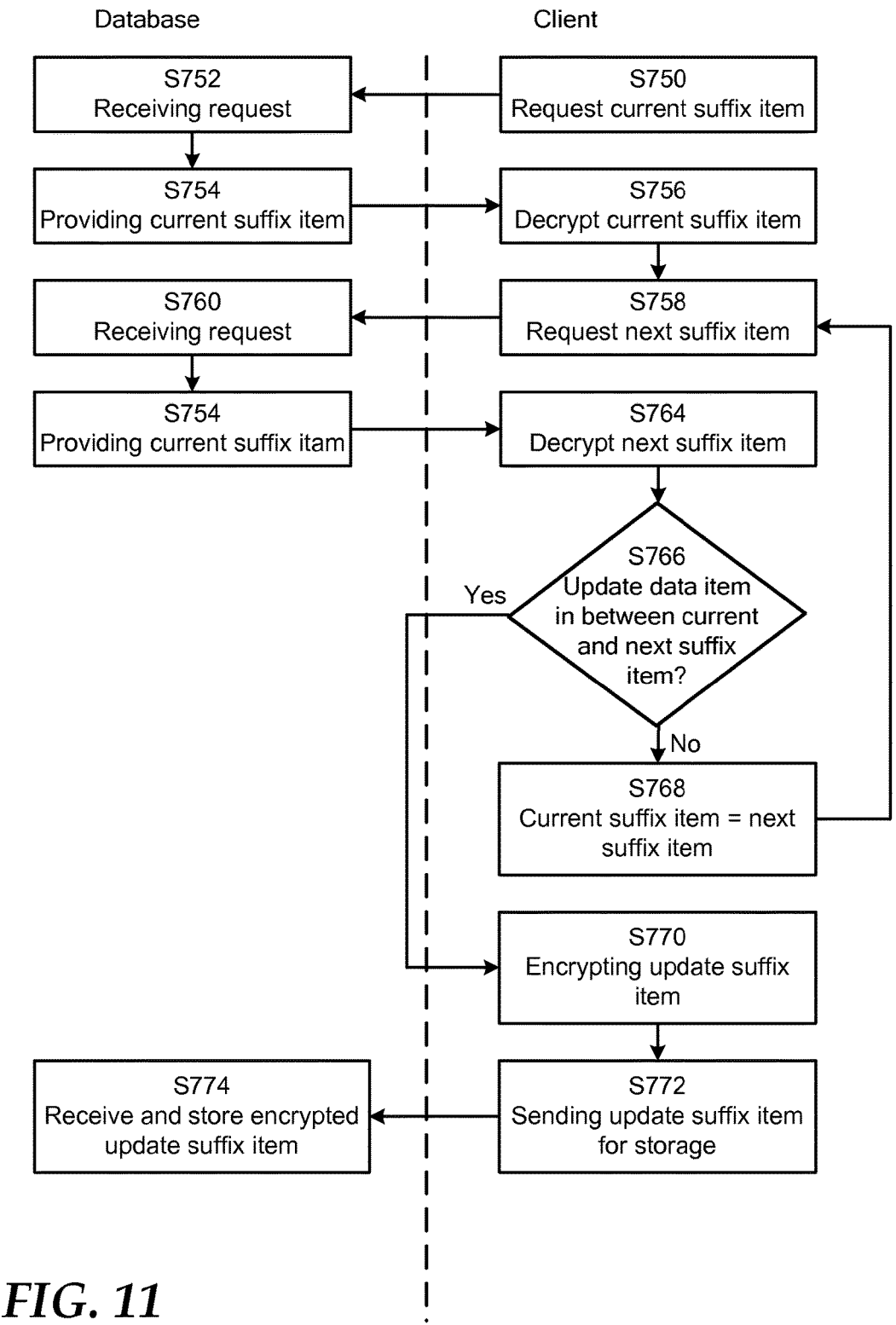
Figure 12:
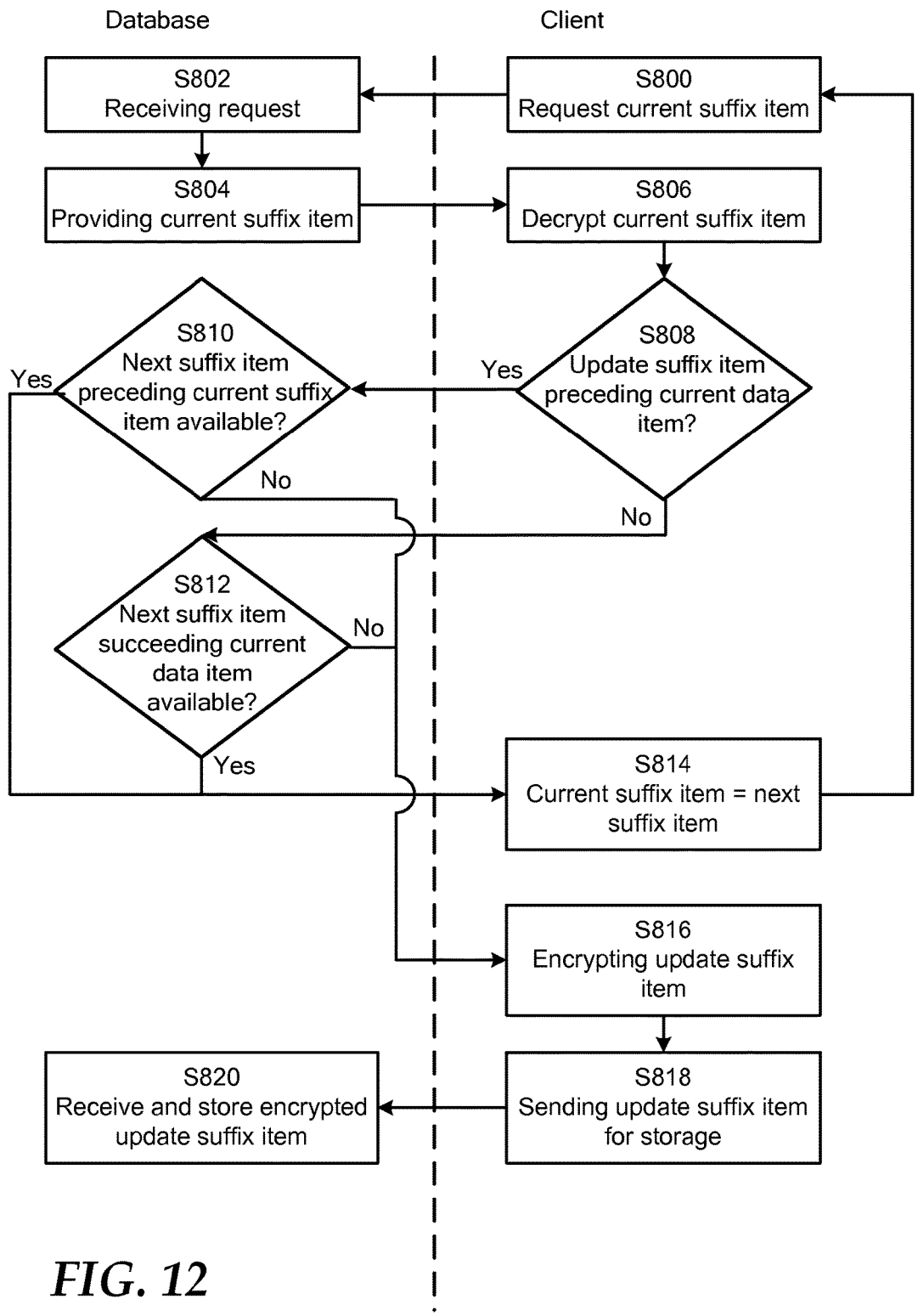

FIG. 4 depicts a cloud computing node according to an embodiment of the present invention, FIG. 5 depicts a cloud computing environment according to an embodiment of the present invention, FIG. 6 is a block diagram of a computer system as described above, FIG. 7 is a more detailed block diagram being illustrative of a client computer system, FIG. 8 is a flow diagram illustrating a method for retrieval of an encrypted data item, FIG. 9 is a flow chart being illustrative for storing an encrypted data item in the database system, FIG. 10 is a flow chart illustrating steps of selecting interval boundaries, FIG. 11 is a flow chart illustrating steps of updating a database, FIG. 12 is a flow chart illustrating steps of updating a database.

Throughout the following description of various embodiments of the invention identical reference numerals are used for designating like or identical elements.

Figure 1:
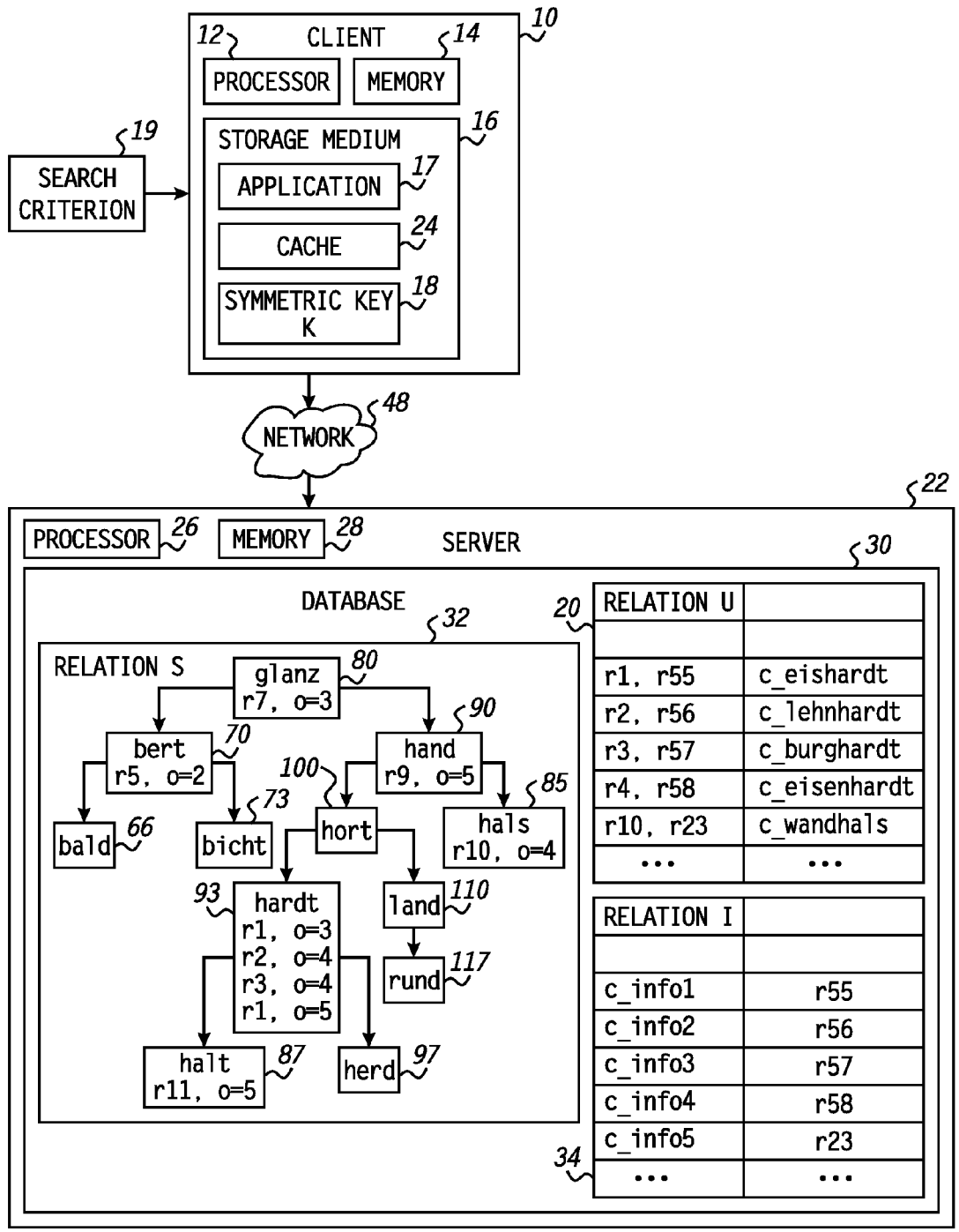
FIG. 1 illustrates a computer system for querying a database.

FIG. 1 illustrates a computer system comprising a client computer 10 and a database 30 stored on a server 22. The server 22 is coupled to the client computer 10 via a network 48. The database 30 comprises a first relation 32, called S, which in the example of FIG. 1 is a rooted tree. Further, the database 30 comprises a second relation U designated by reference numeral 20 which comprises two columns. Further, the database 30 comprises a third relation I designated by reference numeral 34 which comprises two columns.

The client has a processor 12 and a memory, like for example a RAM memory 14. Further, the client 10 has a storage medium 16 stored thereon an application 17 and a symmetric key K 18. The storage medium further comprises a cache 24 whose purpose will be described later.

Similarly, the server 22 has a processor 26 and a volatile memory 28. It has to be noted here, that for the given examples the usage of a symmetric key is assumed. However, the explained concept is also applicable for usage of asymmetric key pairs instead of a symmetric key.

Without restriction to generality, in the following it is assumed that the computer system is located in a medical environment. For example, the client 10 may be part of a medical office or a hospital and the database 30 of the server 22 is located in an external database center, like a cloud computing center. Thus, the client 10 and the server 22 are located in different locations.

Also, without restriction to generality it is assumed that the second relation 20 stores as attribute last names in encrypted form ($c\_a_i$; i=1 . . . m) and two referential connections r1 . . . rm for each encrypted last name. One of these referential connections assigns a respective first data item $a_i$ (i.e. the name) to an encrypted data item c_info stored in the third relation I (reference numeral 34). Each data item "info" comprises information content associated with its respective data item in the relation U (20). For example, relation U only stores names, whereas relation I stores additional information like a birthday, address etc. for each name.

The first relation S (32) stores suffix items for each name stored in the relation U (20). The suffix items are stored encrypted in the first relation 32. However, for sake of simplicity, the indication that storage of the suffix is performed encrypted "c_suffix" has been omitted from the drawing.

Each suffix item describes a suffix of at least one first data item comprised in the relation U. For each suffix item a referential connection exists in the database assigning said suffix item to the at least one first data item comprising the suffix of said suffix item. For example, referential connection r1 assigns the suffix item "hardt" to the first data item c_eishardt.

Further, each suffix item has assigned an offset value for each first data item (c_name) being assigned to the suffix item via the referential connection, the offset value describing the difference in the word length between the first data item and the assigned suffix item. In a practical example, the name "eishardt" can be split as follows:

| Suffix | offset |
|---|---|
| ishardt | 1 |
| shardt | 2 |
| hardt | 3 |
| ardt | 4 |
| rdt | 5 |
| dt | 6 |
| t | 7 |

Each of the suffixes will be stored encrypted in the relation S, assigned via a referential connection r1 with the corresponding encrypted name c_eishardt in the relation U. Further, the offset will be provided for each suffix.

As can be seen from FIG. 1, a suffix may be associated to multiple encrypted names comprised encrypted in the relation U. Each referential connection r1, r2, r3, r4 of the suffix "hardt" is assigned a respective offset. For example for the name "eisenhardt", the offset of the suffix "hardt" is 5 symbols (characters). For the name "lehnhardt", the offset of the suffix "hardt" is 4 symbols etc.

For the sake of simplicity, only some exemplary referential connections and offsets are shown in FIG. 1. However, every encrypted suffix item has associated at least one referential connection and offset. The offset is optional.

The suffix items in the relation S form a partially ordered set, the partial order being formed with respect to the suffix items in non-encrypted form. This means, that in the example of FIG. 1 in the relation S the encrypted suffix items are for example lexicographically sorted. For example bald<bert<glanz; halt<hardt<hort . . . . This sorting is reflected in the relation S by providing each suffix item with respective order information. In the example of FIG. 1, the order information is given by the arrangement of the data items in the rooted tree.

Further, without any restriction to generality it is assumed that the encrypted suffix items are annotated with integer elements of a linear order in the database, wherein the linear order is corresponding to the order in which the encrypted suffix items are stored in the first relation with respect to the partial ordered set. The elements of linear order are shown in integer numbers, for example 66, 70, 73, 80 etc.

In the following, a procedure for querying the database 30 is discussed using both, the block diagram in FIG. 1 and the flowchart in FIG. 2.

After receiving (S500) the search criterion 19 as a prefix search "????Ha*", the application 17 optionally lexicographically normalizes the search criterion (S502). The search request is specifying an infix search on the search criterion 19 "Ha". The reason for such a search request is the following: in order to ease the handling of retrieval of patient records, at the reception desk of the medical office the secretary may wish to type a patient's last name without knowing in detail how the name is spelled. The secretary may only have understood the middle part of the last name "... ha ...". Thus, instead of querying the database for the exact name (which in the following is assumed to be "lehnhardt", the secretary may decide to search for "????ha*". Here, the "????" indicate an offset of 4.

It has to be noted here that the encrypted suffix items stored in the relation S are encrypted with the cryptographic key K in the relation S. Since the client computer 10 and the server 22 are used for handling of medical data records, it is crucial that any information leaving the client and thus the environment of the medical office is kept confidential. It has to be ensured that no unauthorized person may ever have access to the patient data records. This includes the administrator of the database 30 at the server 22. Therefore, any data communicated over the network 48 must be encrypted. The same holds for any data stored in the database 30.

The text normalization is understood as any procedure which is adapted for transforming text including numbers and dates into a single canonical form. For example, this comprises lemmatization and/or stemming of the text. This may have the advantage that for example irrespective of the lexicographic writing of the search criterion, the client is able to retrieve correctly the searched suffix item. A text normalization function may for example be adapted to normalize all letters in a word to only small letters or only capital letters. Further, a more high sophisticated normalization function may automatically correct common spelling errors or typos such that the probability of finding a searched suffix item is drastically enhanced.

Further, in step S502, the wildcard(s) on the left side of the search criterion are disregarded. This results in a search for "ha*".

The interval is determined in step S504 by $x \in [ha, hb)$. Without restriction to generality it is assumed that first the suffix item forming the left interval boundary is determined. Thus, the client requests in step S506 an encrypted suffix item from the database. Since the relation S is a rooted tree, which preferably is automatically balanced by the database, the requested encrypted suffix item is the root of the tree. In response to said requesting of the encrypted suffix item, in step S508 the encrypted suffix item c_glanz is obtained, which is then decrypted for obtaining a decrypted suffix item "glanz".

In step S510 it is determined if the decrypted suffix item "glanz" lies within the search interval. Since "glanz" is outside the search interval, in the next step S512 an encrypted suffix item is requested, wherein the request for the encrypted suffix item comprises information that the encrypted suffix item is to be retrieved from a position in the partial order preceding or succeeding the position of the encrypted suffix item "c_glanz", depending if the interval boundary is preceding or succeeding the decrypted suffix item with respect to the partial order. Since the boundary "ha" is succeeding the position of "glanz", the requested encrypted suffix item is requested at a position following "glanz" in the right direction of the tree in FIG. 1.

As a result, in step S522 the data item c_hand is received and decrypted (S524). In step S516 it is determined if the decrypted suffix item "hand" lies within the search interval. Since this is the case, in the subsequent step S528 a request for an encrypted suffix item is made by the client, wherein the request for the encrypted suffix item comprises information that the encrypted suffix item is to be retrieved from a position in the partial order preceding the position of the encrypted suffix item "c_hand". The reason is that it has to be tested if another suffix item is available which is closer to the left interval boundary "ha" than "hand".

As a response, in step S530 "c_hals" is received and decrypted (S532). In step S534 it is determined if the decrypted suffix item "hals" lies within the search interval. Since this is still the case, in the subsequent step S536 a request for an encrypted suffix item is made by the client, wherein the request for the encrypted suffix item comprises information that the encrypted suffix item is to be retrieved from a position in the partial order again preceding the position of the encrypted suffix item "c_hals". However, since "c_hals" forms a leaf node of the suffix item tree of relation S, no further encrypted suffix item is available on the left side of "c_hals". In other words, "c_hals" and thus "hals" forms the left boundary of the search interval.

As a response, in step S538 a response is received from the database indicating that no further encrypted suffix item is available. Therefore, in step S544 the decrypted suffix item which was last identified as lying in the search interval is determined as the suffix item forming the interval boundary of the search interval. Thus the interval boundary is given by the element "hals".

In step S546 the same procedure is repeated with the prerequisite, that the interval boundary shall be given by any element being lexicographically "smaller" than "hb". The procedure is repeated with the suffix item "c_hals" as a starting point (i.e. steps S506ff are performed starting with c_hals and the condition that the right boundary for "hb" is searched).

This results with similar steps as described above in step S548 in the identification of the element "c_hardt". Thus, the interval boundaries of the search interval [ha, hb) are formed by the suffix items "c_hals" and "c_hardt".

In step S550 the client requests the database to determine the integer numbers annotated to the encrypted data items "c_hals" and "c_hardt" and to provide (S552) all encrypted data items having integer numbers in between said determined integer numbers and having an offset equal 4 (o=4).

The reason for the restriction of encrypted data items with an offset 4 is that the search in step S500 indicated a search for 4 symbols on the left side of the search criterion "Ha". Since the integer number of "c_hals" is 85 and the integer number of "c_hardt" is 93, the resulting data items satisfying the search interval are given by the suffix items with annotated integer numbers 85, 87, 90, 93. Of these suffix items, only referential connections having an offset of 4 are identified which yields the referential connections r2, r3 and r10.

Via these referential connection r2, r3 and r10 the encrypted data items "c_lehnhardt", "c_burghardt" and "c_wandhals" are then requested from relation U, received at the client (S544) and decrypted using the cryptographic key K (S556). This results in the names "lehnhardt", "burghardt" and "wandhals".

It has to be noted that this provision of all encrypted data items having integer numbers in between said determined integer numbers can be performed by common database techniques readily available in many common databases. Thus, such kind of data item provision may be accomplished with high performance.

It has to be noted that without restriction to generality, it is assumed that the cryptographic key used for decryption of the suffix items and data items is the same. However, different cryptographic keys may be used. Further, an individual key may be used for each individual data item and each individual suffix item.

For example, each key may be individually generated from a hash value of the suffix or data item. "eishardt" may be encrypted by a key obtained from a combination of Hash(eishardt) and the symmetric key K. The hash has to be stored together with c_eishardt in order to allow for a later decryption. For example, the hash value and c_eishardt may be stored concatenated in the relation U: Hash(eishardt)+ c_eishardt. The same principle holds for the suffix items and the items comprised in the relation I. Alternatively, a unique random value may be used for each data item. Then, in the above explanation the hash value is replaced by the random value.

Figure 2:
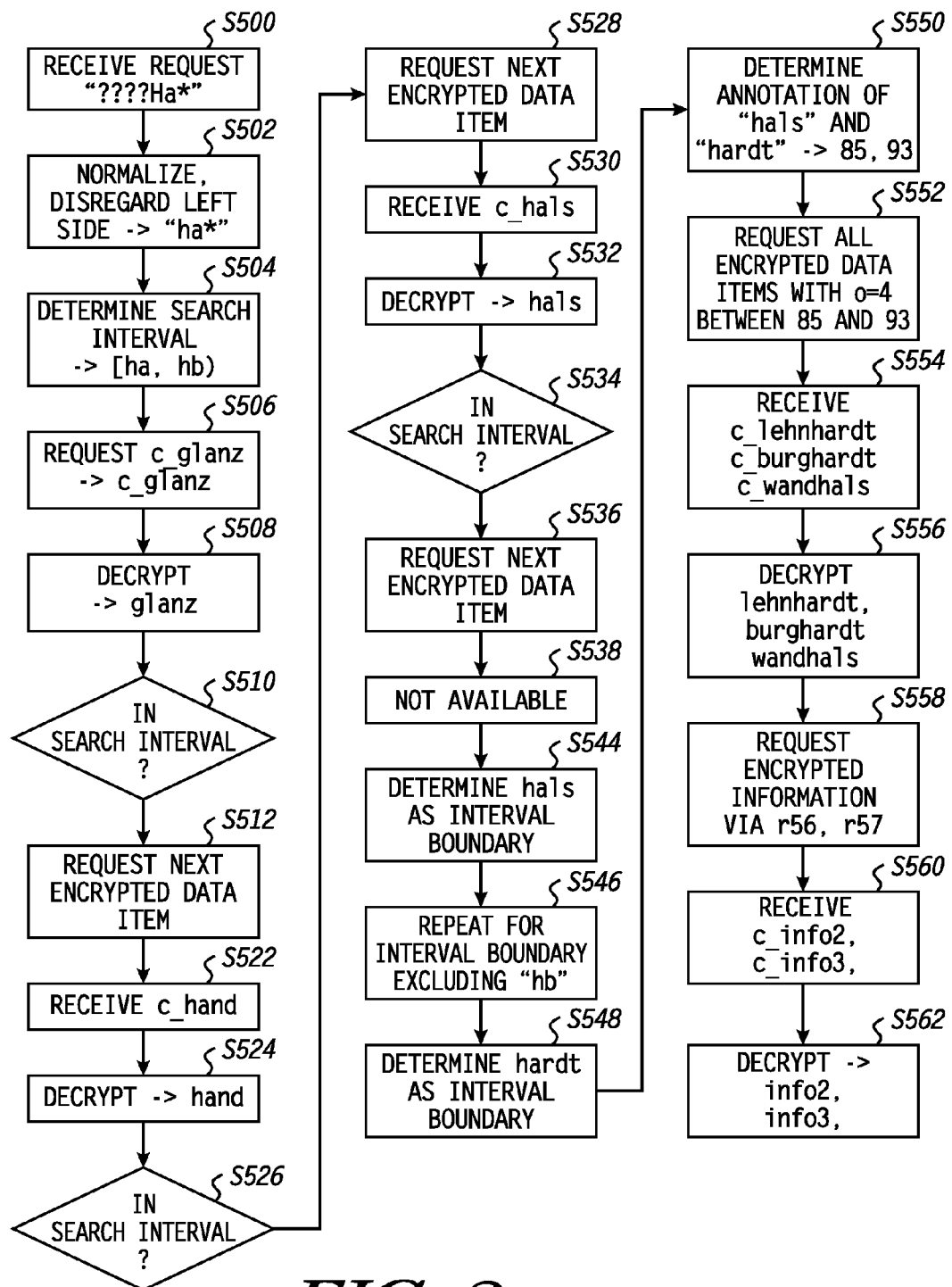
FIG. 2 is a flow chart illustrating steps of selecting interval boundaries.

Referring back to the flowchart in FIG. 2, the method may continue with the optional subsequent steps S558-S562. The identified last names "lehnhardt", "burghardt" and "wandhals" may be presented on a computer screen of the secretary. Then, the secretary may select the names "lehnhardt" and "burghardt" for retrieval of further information like the birthdays associated with the patients. Upon selection of the names, a request (S558) for encrypted information associated with the data items "lehnhardt" and "burghardt" is provided to the database 30. Via the referential connections r56 and r57, the database will then be able to obtain c_info2 and c_info3 from relation I. The information is provided to the client, received (S560) and decrypted by the client (S562). For example, the decryption of c_info2 results in information "16.01.1980". Thus, the birthday of patient lehnhardt is given by said date.

Thus, in summary by receiving an infix search "????ha*", the client is able to retrieve all suffix items of relation S and relevant information content in a very efficient and fast manner. Nevertheless, the database 32 or the server 22 is neither aware of the content of the suffix items nor the associated information content.

Figure 3:
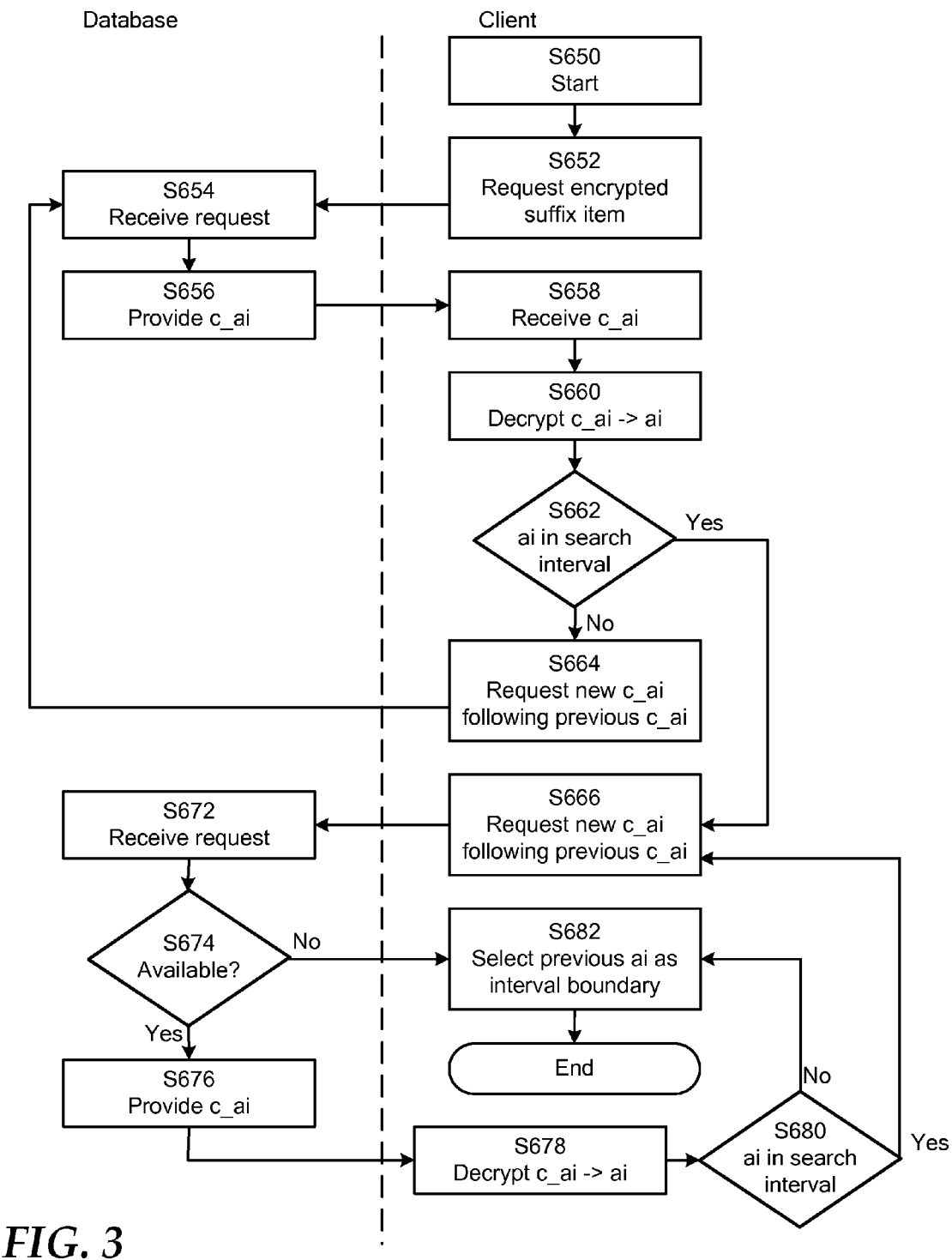
FIG. 3 is a flow chart illustrating steps of selecting interval boundaries.

FIG. 3 depicts a flowchart in which, compared the flowchart in FIG. 2, in a more generalized manner the determination of an interval boundary is explained. In step S650 the method starts for example with an optional lexicographic normalization of a search criterion from which a search interval is to be determined. The client requests in step S652 an encrypted current suffix item from the database. The request is received at the database (S654) and the requested current suffix item c_ai is provided to the client (S656). After receiving c_ai (S658) the client decrypts c_ai in order to obtain ai, i.e. the decrypted current suffix item.

Then the client determines if the current decrypted suffix item lies within the search interval (S662). If this is not the case, i.e. in case the current decrypted suffix item lies outside the search interval, a request for a new encrypted suffix item is provided to the database (S664), wherein the request for the new encrypted suffix item comprises information that the new encrypted suffix item is to be retrieved from a position in the partial order preceding or succeeding the position of the current encrypted suffix item, depending if the interval boundary is preceding or succeeding the current decrypted suffix item with respect to the partial order. The request is received at the database (S668) and in response the new requested encrypted suffix item c_ai is provided by the database to the client (S656). The method continues with steps S658 and S660, i.e. receiving and decrypting the new encrypted suffix item.

In case in step S662 it is determined that the current decrypted suffix item lies inside the search interval, a request for a new encrypted suffix item is provided by the client to the server (S666), wherein the request for the new encrypted suffix item comprises information that the new encrypted suffix item is to be retrieved from a position in the partial order preceding or succeeding the position of the current encrypted suffix item, depending if the interval boundary is preceding or succeeding the current decrypted suffix item with respect to the partial order. The request is received at the database (S672).

In step S674 the database determines if a subsequent encrypted suffix item is available at the indicated position. This might not be the case if the current decrypted suffix item is for example a leaf element (here it shall be assumed that in the database the suffix items form a partial ordered set in said database via a rooted tree).

In case in step S674 a subsequent encrypted suffix item is available at the indicated position, the database will provide a new encrypted suffix item c_ai (S676), which is then received and decrypted by the client (S678) for obtaining ai. In step S680 it is determined if the new decrypted suffix item ai is lying in the search interval.

In case the new decrypted suffix item lies outside the search interval, this indicates that step S666 'overshooted' the suffix item forming the interval boundary. Thus, the current decrypted suffix item, i.e. the suffix item which was previously determined as lying in the search interval in step S662, is determined as the suffix item forming the interval boundary of the search interval (S682). Then the method continues with selecting the next relation for which the suffix item forming the interval boundary has to be determined (S684 and subsequent step S652).

In case in step S680 the new decrypted suffix item lies within the search interval, the method continues with previously discussed step S666. This is because of non-overshooting the interval boundary the method (steps S666 ff.) has to be repeated at least one more time.

In case in step S674 a subsequent new suffix item is not available, the suffix item determined in S666 must form the interval boundary. Thus, in this case the method continues with discussed step S682.

It has to be noted that in the loop of steps S660-S670 it may turn out that the relation does not comprise any suffix item lying in the interval. In this case no suffix item forming the interval boundary can be provided and the method directly continues with step S684.

A cloud computing environment is service oriented with a focus on statelessness, low coupling, modularity, and semantic interoperability. At the heart of cloud computing is an infrastructure comprising a network of interconnected nodes. Referring now to FIG. 4, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove. Thus node 1010 may be client 10 or the server 22. Further, multiple nodes may be present.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016. Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 12 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Referring now to FIG. 5, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B and/or laptop computer 1054C. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

FIG. 6 shows a computer system 100 that comprises multiple sets of client computers, i.e. a number I of sets S1, S2, . . . Si, . . . SI−1, SI. Each one of the sets Si is located in a respective trusted environment 102 that is in some way access restricted. For example, the set S1 of client computers is located within trusted environment 102.1, set S2 of client computers in trusted environment 102.2, . . . set Si of client computers in trusted environment 102.*i* etc. such that there is a one-to-one relationship between sets Si of client computers and trusted environments 102.*i*. Alternatively at least one, some or all of the client computers are located outside a trusted environment, such as in a vehicle.

One of the trusted environments 102.*i* may be a medical practice or another enclosed area in a building, with restricted access. For example access into one of the trusted environments 102.*i* can be restricted by means of an electronic access control system and/or physical and/or organizational measures.

In the following the set Si of client computers is considered by way of example only and without restriction of generality: The set Si has a number of J client computers Ci1, Ci2, . . . Cij, . . . CiJ. On each one of the client computers Cij an application program 104 is installed that has a configuration file 106 storing client computer specific database log-in information Lij.

The database log-in information Lij of a given client computer Cij can be constituted by a 'username'/password combination or other authentication information. It is important to note that the 'username'/password combination or other authentication information is not assigned to an actual user but to the respective client computer Cij on which the application program 104 with the log-in information Lij is installed. Hence, 'username' does not refer to a user but to a specific client computer Cij.

The same applies analogously to the other sets of client computers where the number J of client computers per set can vary.

A group of a number K of authorized users Ui1, Ui2, Uik, . . . UiK has access to the trusted environment 102.*i*, where the number of authorized users K can be below, equal or greater than the number of client computers J. Each client computer Cij of the set Si is set up such that any one of that group of authorized users which are authorized with respect to the trusted environment 102.*i* can utilize any one of these client computers of set Si.

Each one of the authorized users Uik has an assigned security token STik, such as a chip card. Each one of the security tokens STik has a memory for storing a cryptographic key 108 and a key identifier 110 of the cryptographic key 108.

The key 108 of security token STik may be specific to the user Uik to which the security token STik is assigned such that all authorized users across all trusted environments 102 have different cryptographic keys 108. Alternatively, the cryptographic keys 108 are user-group specific. For example, a user-group is constituted by all users Ui1 to UiK of the trusted environment 102.*i* such that all authorized users of that trusted environment 102.*i* share the same cryptographic key 108. Alternatively, one or more sub-groups of users of the group of authorized users of one of the trusted environments 102.*i* can be defined such that users of that sub-group share identical cryptographic keys 108.

The key identifier 110 can be a globally unique identifier (GUID) of the cryptographic key 108 such that any of the cryptographic keys 108 is unequivocally identified by its respective key identifier 110.

Each one of the sets of client computers is coupled to a database system 112 via a network 114, such as the internet. The database system comprises a number of I databases DB1, DB2, . . . , DBi, . . . , DBI-1, . . . , DBI. Each one of the databases may be a relational database comprising database tables 116. Each one of the databases is assigned to one of the sets of client computers such that there is a one-to-one relationship between databases and sets of client computers. In other words, the set Si of client computers is assigned to the database DBi.

By way of example one of the database tables 116 of the database DBi is shown in a schematic way:

| Encrypted data item | key identifier |
|---|---|
| c | GUID (key) |
| ... | ... | where c is an encrypted data item, i.e. a cipher text that has been obtained by encryption of the data item like the first data item, a second data item or the suffix item using the cryptographic key 108 that is identified by the GUID stored as an attribute of c in the database table 116. The database table 116 may be split into separate relational database tables depending on the implementation.

It is important to note that the key 108 itself is not stored anywhere in the database system 112 and that the database tables 116 merely comprise cipher text, key identifiers and digital signatures, depending on the implementation. Hence, confidentiality of the data that is stored in the database tables 116 of the database system 112 does not need to be ensured as all data items are stored in encrypted form and the key identifiers and digital signatures are stored as attributes of the cipher text but not the keys themselves.

The database system 112 has a log-in component 118 that serves for logging in the various client computers of the sets of client computers. The log-in component 118 has access to assignment information 120 that is stored in the database system 112. The assignment information 120 may be stored in tabular form using the log-in information Lij of the configuration files 106 for specifying the assignments of the sets of client computers to the databases. For example, the assignment information 120 may be stored in the following tabular form:

| Client specific log-in information | database |
|---|---|
| Lij | i |
| ... | ... |

In other words, each log-in information Lij is assigned to one of the databases DBi that is identified by its index i in the tabular assignment information 120. The assignment information 120 may be split into separate relational database tables depending on the implementation.

Without restriction of generality and by way of example the user Uik is considered in the following:

The user Uik enters the trusted environment 102.*i*. If the trusted environment 102.*i* has an electronic access control system the user Uik may utilize its security token STik for obtaining access to the trusted environment 102.*i* through the electronic access control system, such as by inserting the security token STik or bringing the security token STik into the proximity of a chip card reader of the electronic access control system.

The user Uik may then select any one of the client computers of the set Si, such as client computer Cij. Depending on the implementation, the client computer Cij may have a log-in component for logging in the user Uik.

In response to a respective command entered by the user Uik into client computer Cij the application program 104 establishes a network session, such as an internet session 122 with the database system 112. The application program 104 reads the log-in information Lij from its configuration file 106 and sends the log-in information Lij via the internet session 122 to the database system 112 where it is received by the log-in component 118.

The log-in component 118 searches the assignment information for a matching log-in information. If such a matching log-in information can be identified the respective assignment of the matching log-in information Lij to one of the databases DBi is read from the assignment information 120 and a database connection is established between that database DBi and the application program 104 of the client computer Cij.

The application program 104 reads the key 108 and the key identifier 110 from the security token STik of the user Uik and stores this information temporarily. This may require unlocking the security token STik by authentication of the user Uik against the security token STik, such as by entry of a PIN.

The user Uik may then enter the search criterion into the application program 104 of the client computer Cij, such as an unencrypted data item for which matching records that are stored in the database system 112 are to be retrieved. Upon entry of the data item the application program 104 encrypts the data item using the key 108. The application program 104 then generates a database query 124 that contains the encrypted data item as a search criterion and the key identifier 110 of the cryptographic key 108 as an additional search criterion in order to limit the search to such encrypted data items that have a matching key identifier attribute.

This database query 124 is transmitted via the database connection established over the internet session 122 to the database DBi that has been identified by the log-in component 118 as the database that is assigned to the set Si. The database DBi executes a search for data records that have encrypted data items that match the encrypted data item and which in addition have a matching key identifier, i.e. a matching GUID, for processing of the query 124. This limits the search results to data items that have been encrypted by the key 108.

These search results 126 are returned from the database DBi to the application program 104 of the client computer Cij. The application program 104 decrypts the encrypted data items contained in result 126 by means of the key 108 and outputs the decrypted data items such as on a display of the client computer Cij.

For storing a data item in the database system 112 a database connection is established as described above. The user Uik enters a data item to be stored into the application program 104 which encrypts the data item using the key 108 and generates a database insert command for writing the encrypted data item with the key identifier 110 as an attribute to the database DBi.

FIG. 7 shows a block diagram of a further embodiment of the invention. By way of example and without restriction of generality an arbitrary security token STik of a user Uik that has selected client computer Cij is shown in FIG. 7 whereby the other security tokens and client computers of the computer system 100 can be structurally identical or similar. However, it may be noted that the cryptographic key 108 may be obtained by any suitable means. For example, the cryptographic key 108 may be entered manually by a user into the application program 104 or the key 108 may be generated by the application program 104 using a user name and password of the user.

The security token STik has an electronic memory 128 for storing the cryptographic key 108 and the key identifier 110.

Further, a private key 130 that belongs to an asymmetric cryptographic key pair assigned to the user Uik and the security token STik is stored in a secure storage area of the memory 128. A corresponding certificate 132 that contains the respective public key of the asymmetric cryptographic key pair may also be stored in the memory 128 or elsewhere.

The certificate 132 is a public key certificate that is also known as digital certificate that may be signed by a certificate authority within a public key infrastructure scheme. The certificate 132 may comply with any respective standard, such as X.509.

Further, authentication information 134 may be stored within a secure storage location of the memory 128, such as a personal identification number (PIN). Correct entry of the authentication information 134 into the security token STik may be required for unlocking the security token STik.

The security token STik has a processor 136 for execution of program modules 138 and 140. Further, the security token STik has a communication interface 142.

The program module 140 serves for authentication of the user Uik. For authentication the user Uik enters authentication information, such as a PIN, that the security token STik receives at its interface 142. By execution of the program module 140 the validity of the authentication information entered by the user Uik is checked by comparing it to the authentication information 134 that is stored in the memory 128. If the entered authentication information matches the authentication information 134 an authentication signal is generated by the program module 140 for unlocking the security token STik. This enables to read out the cryptographic key 108 and the key identifier 110 via the interface 142 and to request the generation of an electronic signature by execution of the program module 138 that uses the private key 130 for generating an electronic signature by the application program 104.

The client computer Cij has a communication interface 144 that is interoperable with the interface 142 of the security token STik. For example, the interfaces 142 and 144 are chip card interfaces or RF interfaces that comply with an RFID and/or NFC communication standard.

The client computer Cij has a processor 146 for execution of a program module 148 that may be part of the operating system and for execution of the application program 104 (cf. FIG. 6).

The program module 148 implements a log-in component that serves for logging in and logging out a user with respect to the client computer Cij. A user log-in may be performed by entering a username/password combination into the client computer Cij and matching that entered username/password combination with a respective authentication data 150 that contains the same username/password combination and which is stored in non-volatile memory 152 of the client computer Cij. Log-out may be performed automatically by the program module 148 when a timeout condition of extended user inaction is fulfilled.

The application program 104 comprises a program module 154 for authentication of the application program 104 and the client computer Cij on which it is installed vis-à-vis the database system 112. For that purpose the program module 154 is interoperable with the log-in component 118.

The application program 104 further comprises a program module 156 for encryption of a data item by means of the key 108 and a program module 158 for decryption of an encrypted data item using the key 108. The client computer Cij has a working volatile memory 160 for storing a copy of the cryptographic key 108 and its key identifier 110. A configuration file 106, such as an INI file, that contains the client computer specific log-in information required by the log-in component 118 is stored in the non-volatile memory 152.

Further, the client computer Cij has a network interface 164 for coupling the client computer Cij to the database system 112 via the network 114.

In operation the user logs into client computer Cij by entry of his or her username/password combination which is checked against the authentication data 150 stored in the memory 152 by the program module 148. If the entered username/password combination of the user Uik matches the authentication data 150 the user Uik is successfully logged into the client computer Cij. Execution of the application program 104 is started. This can be implemented by the standard Windows log-in if an Windows operating system is utilized on the client computer.

Next, the application program 104 prompts the user Uik to present his or her security token STik at the interface 144 such as by inserting the security token STik into a chip card reader of the client computer Cij. Next, the user Uik needs to authenticate vis-à-vis the security token STik for unlocking the security token. This is done by entry of the user's PIN into the security token STik either via the client computer Cij, via the chip card reader or directly into the security token STik depending on the implementation.

When the security token STik is unlocked the application program 104 generates a read command that is communicated via the interfaces 144 and 142 such as in the form of a command APDU for reading out the cryptographic key 108 and its key identifier 110. Copies of the key 108 and the key identifier 110 are then stored in the memory 160 by the application program 104.

Further, the application program 104 initiates the establishment of a database connection with the database system 112 by establishing the internet session 122, reading of the configuration file 106 that contains the client computer specific log-in information Lij by the program module 154 and sending the client computer specific log-in information Lij to the log-in component 118.

The log-in component 118 determines the database to which the set Si of client computers to which the client computer Cij belongs is assigned using the assignment information, i.e. by determining i from the tabular assignment information 120 by means of the log-in information Lij contained in the configuration file 106 (cf. FIG. 6).

The database connection is then established between the application program 104 and the determined database, i.e. the database DBi, provided that the log-in information Lij is correct.

For retrieval of a data item or a data record that contains that data item the following steps are executed:
The user Uik enters the data item as a search criterion into the application program 104.
The application program 104 reads the key 108 from memory 160 and executes the program module 156 for encryption of the data item with the key 108 which provides the cipher text c.
The application program 104 reads the key identifier 110 from the memory 160.
The application program 104 generates a database query, such as an SQL query, containing the cipher text c and the key identifier 110 as search criteria and sends the database query via the database connection that has been established over the internet session 122 to the database DBi.
The database DBi executes the database query by searching for matching data records that contain the cipher text c and the key identifier 110. The database DBi then returns matching data items via the database connection to the application program 104.
The application program 104 decrypts the returned data items by execution of the program module 158 using the cryptographic key 108 for decryption. If the data record contains a digital signature the validity of the digital signature is checked by the application program 104. The decrypted data records may then be displayed on a display of the client computer Cij. If the signature is invalid an error signal may be outputted.

For writing data to the database system 112 the following steps are performed after the database connection has been established:
The user Uik enters at least one data item or a complete data record that contains this data item in one of its data fields into the application program 104.
The application program 104 generates a command for generating a digital signature for the entered data item or data record which is sent via the interface 144 to the security token STik. For example, the application program 104 generates a hash value for the data item or the data record which is sent to the security token STik via the interface 144 for generating the signature by program module 138 using the private key 130.
The application program 104 reads the cryptographic key 108 from the memory 160.
The application program 104 encrypts the data item and other data contained in data fields of the data record, if any, by execution of the program module 156 using the cryptographic key 108.
The application program 104 reads the key identifier 110 from the memory 160.
The application program 104 generates a database insert command for writing the encrypted data item in conjunction with the key identifier 110 as an attribute and together with the digital signature to the database DBi.
The database insert command is transmitted from the application program 104 via the database connection and executed by the database DBi. The database DBi returns an acknowledgement to the application program 104 after completion of the database insert operation.

It is important to note that in this example the database DBi does not check the validity of the signature that it receives with the database insert command. Checking of the signature only occurs after retrieval of the encrypted data item or data record from the database DBi in the client domain, e.g. by client computer Cij, in the embodiment considered here. However, in an embodiment the encrypted data item may be signed by the application program 104 which provides an alternative or additional digital signature which is transmitted to the database. In this case, the database may be able to directly verify the resulting signature of the encrypted data item.

FIG. 8 shows a flowchart of an embodiment of a method for retrieval of data from the database system 112.

In step 200 one of the users Uik that is an authorized user of the set Si of client computers that are within the trusted environment 102.i selects one of the client computers Cij of that set Si. In step 202 the user Uik logs into that client computer by entering user specific log-in information, such as his or her username/password or biometric information.

After successful log-in into client computer Cij the application program 104 is started in step 204. In step 206 the user Uik authenticates against his or her security token STik such as by entering his or her PIN. After successful authentication the security token STik is unlocked and the application program 104 can perform a read access onto the security token STik in step 208 for reading the cryptographic key 108 and its key identifier 110. The application program 104 stores copies of the cryptographic key 108 and the key identifier 110 in the working memory 160 of the client computer Cij.

The application program 104 reads the client computer specific log-in information Lij from its configuration file 106, such as its INI file (step 209). In step 210 the internet session 122 is established between the application program 104 and the database system 112 and transmits that log-in information Lij via the internet session 122 to the database system 112, namely its log-in component 118, in step 214.

The log-in component 118 uses the log-in information Lij for retrieval of the assignment of the client computer Cij from the assignment information 120 in step 216 in order to determine the database DBi to which the client computer Cij is assigned. The database connection is then established between that database DBi and the application program 104 over the internet session 122 if the database login operation has been successful.

For retrieval of a data item the user enters an unencrypted search term into the application program 104 in step 218. That search term is encrypted using the cryptographic key 108 in step 220 and a database query is generated in step 222 that contains the encrypted search term and in addition the unencrypted key identifier as an additional search criterion.

That database query is communicated to the database DBi via the database connection and processed by the database DBi in step 224. In response to the database query the database may return one or more encrypted hits to the application program 104, i.e. one or more data items that contain the encrypted search term, in step 226. In step 228 the returned search results are decrypted by the application program 104 using the cryptographic key 108 and the result of the decryption is displayed on a user interface in step 230. A digital signature that may also be returned by the database DBi is checked for validity. This may be a precondition for displaying the hit.

In step 232 a log-off condition is fulfilled, such that the user Uik is logged off from the client computer Cij. Such a user log-off may occur after an extended period of user inaction. As a consequence of the user log-off at least the key 108 is erased from the memory 160 of the client computer Cij in step 234.

FIG. 9 shows a method for writing data to the database system 112.

First, a database connection is established by execution of the steps 200-216 in the same or analogous way as described above with respect to the embodiment of FIG. 8.

Next, the user enters at least one data item in step 318 into the application program 104. The application program 104 encrypts the at least one data item in step 320 using the cryptographic key 108 and generates a database insert command in step 322. The database insert command comprises the at least one encrypted data item and the unencrypted key identifier 110 of the cryptographic key 108 with which the at least one data item has been encrypted; the database insert command can also comprise a digital signature.

The database insert command is communicated via the database connection to the database DBi which processes the database insert command in step 324. After the at least one encrypted data item has been written to the database table 116 of the database DBi together with the unencrypted key identifier and with a digital signature of the at least one data item, the database DBi returns an acknowledgement to the application program 104 in step 326.

Steps 328 and 330 are analogous to steps 232 and 234 of the FIG. 8 embodiment. In other words, when user log-off occurs at least the key 108 is automatically erased from the memory 160 without retaining a copy of that key 108 by the client computer Cij.

Above in FIG. 3 a method was described in order to determine data items forming an interval boundary in for example a relation. It was assumed that for each new c_ai required by the client, the client provides a request to the database for providing the c_ai. However, in systems in which the client is connected to the database via a network with high latency times this may lead to an unwanted thwarting of the system.

FIG. 10 provides a solution for this scenario. In the following description identical steps of FIG. 3 and FIG. 10 are given in parenthesis.

After starting the method (S650, S700), a request for multiple encrypted suffix items is provided to the database (S652, S702). Compared to step S652, multiple suffix items are requested at the same time, wherein said multiple suffix items are provided in contiguous form as given by the partial order in said database. The request is received at the database (S654, S704), provided to the client (S656, S706), received and decrypted at the client (S658, S708).

The result of S708 is a set with multiple suffix items. This set is stored in a memory assigned to the client. This is for example the cache 24 or a RAM memory 14 of the client 10 in FIG. 1. In step S710 one suffix item of the set of suffix items is selected by the client and decrypted (S660; S712). Step S714 is identical with S662.

In case in subsequent step S716 (S664) a new c_ai following the previous c_ai is requested, the difference between S716 and S664 is that in S716 the client attempts to obtain the new c_ai from the set of c_ai that was received in step S708. In contrast, in FIG. 3 the client again contacts the database for obtaining the new c_ai (steps S664-S674).

In step S718 the client determines if the requested new c_ai is available in the set of c_ai. If this is the case, no further communication with the database is necessary and the method continues with step S710. Contrary in case the requested new c_ai is unavailable in the set of c_ai, the method jumps back to S702 with requesting a new set of multiple suffix items from the database.

In case step S714 (S662) returns that ai is lying in the search interval, the method continues with steps S720ff (S666ff). It has to be noted that steps S720ff are only depicted schematically without providing details. For performing S720ff, the same principles should be applied as discussed with respect to S702ff. This means that with step S720 the available set of c_ai should be checked for availability of the requested new c_ai.

FIG. 11 shows a flowchart illustrating a method of updating a database like for example the database 30 of FIG. 1. Similarly as for querying the database, when updating the database it has to be ensured that at no time the database receives any unencrypted information which would permit a conclusion of the first data items to be stored. Nevertheless, when storing the first data items, the respectively generated suffix items have to also be stored in the database in a manner that the suffix items have to form a partially ordered set in the database.

In the following it is assumed that a certain first data item has to be stored in the database 30. This requires generation of the suffix items by successively truncating a number of symbols from the left side of the first data item. This process was exemplary described with respect to the name "eishardt" above. For explanatory purposes only, one may assume that an update first data item may be stored in the database, like for example a new name "anheld". Respective suffix items may thus comprise "nheld" and "held".

Further, for storing the such generated suffix item "held" in the relation S, the following method may be performed:

The method starts in step S750 in which the client requests any arbitrary current suffix item from the database. The current suffix item requested in S750 may be a tree root item of the relation S in case the partial order in the relation S is given by a rooted tree. In case of a linear order, the current suffix item may be the first or the last suffix item of the linear order. Preferably, the current suffix item is the suffix item located in the middle of all suffix items with respect to the linear order.

The request is received by the database in step S752 and in response to said requesting of the current encrypted suffix item, in step S754 the database provides the suffix item to the client. In step S756 the current encrypted suffix item is received and decrypted by the client using the key K. For example, suffix item "glanz" (see FIG. 1) is obtained. Now, the client will compare the current decrypted suffix item glanz with the "update suffix item" to be stored in the database. For example, the update suffix item may be given by the suffix "held". Depending if the update suffix item is preceding or succeeding the current decrypted suffix item with respect to the partial order, in step S758 the request for the next new encrypted suffix item comprises information that the new encrypted suffix item is to be retrieved from a position in the partial order preceding or succeeding the position of the current encrypted suffix item. This request is provided to the database, received by the database (S760). In response, the database provides the requested suffix item to the client (S762). The client receives this next suffix item as a "new encrypted suffix item" and decrypts said suffix item (S764).

Since the update suffix item "held" is lexicograpically larger than "glanz", the request in step S758 indicates that the suffix item in the linear order following c_glanz is to be retrieved. Thus, in S764 c_hand is obtained.

In case the update suffix item is not located at a position in the partial order between the position of the new decrypted suffix item (held) and the current decrypted suffix item (glanz) this means that the update suffix item is located at a position in the partial order following the position of the new decrypted suffix item (held). Contrary, in case the update suffix item is located at a position in the partial order between the position of the new decrypted suffix item (held) and the current decrypted suffix item (glanz) it is clear that the update suffix item has to be stored in the relation S in between the suffix items c_glanz and c_hand.

These principles are reflected in steps S766ff: in step S766 it is determined if the update suffix item is located at a position in the partial order between the position of the new decrypted suffix item and the current decrypted suffix item. If this is not the case, the method proceeds with S768 and S758, wherein S768 defines that the new encrypted suffix item is the current encrypted suffix item, i.e. that the search has to start over again for a next suffix item following or preceding "hand", depending the new encrypted suffix item being the current encrypted suffix item.

Contrary, in case in step S766 the result is that the update suffix item is located at a position in the partial order between the position of the new decrypted suffix item and the current decrypted suffix item, the method continues with step S770 in which the update suffix item is encrypted using the key K. In step S772 a storage request is provided by the client to the database, the storage request comprising the encrypted update suffix item and a position information, the position information instructing the server to store the encrypted update suffix item in the database at a position in the partial order between the new decrypted suffix item and the current decrypted suffix item.

In step S774 the request is received and carried out by the database. The request may further instruct the database to provide the encrypted update suffix item to be stored with a numeral position information. Preferably, this is an integer number with a value in between the position information of the new decrypted suffix item and the position information of the current decrypted suffix item. In the above example, for storage of the suffix item "held" this would be a value in between 93 and 97, for example 94 or 95 or 96. In case such an integer number would not be available, the database may rearrange all position information values in the relation in order to provide "numerical space" in between the position information of the new decrypted suffix item and the position information of the current decrypted suffix item.

It has to be noted that in case of storing suffix items for a new first data item, the method of steps S750-S774 is repeated for all possible numbers of the successional symbols being removed from the left side of the update first data item as the offset value. This was discussed above with respect to FIG. 1. The "update first data item" is the data item to be stored in relation U, for example the above mentioned name "anheld". However, the method of steps S750-S774 may be stopped in case only minimum predefined number of symbols is left in the update data item. For example, in case of eishardt, the method may be repeated until 3 symbols are left, i.e. until " . . . eld" is left. This results in suffixes "nheld", "held", "eld".

Additionally, information content may be associated with the data items of relation U. In this case, the database further comprises the second relation I (see FIG. 1), wherein the second relation comprises second data items c_info (or is empty on the beginning). The second data items are encrypted with a second cryptographic key, wherein a referential connection exists assigning each encrypted data item of the relation U to at least one of the second data items stored encrypted in the second relation. The further information content is comprised in the second data items.

The client may encrypt the information content associated with the update suffix item with a second cryptographic key, wherein the storage request (S772) further comprises an instruction to the database to store the encrypted data item and encrypted information content associated with the update suffix item in the respective relation U and I and to provide the corresponding referential connections in the database.

FIG. 12 shows a flowchart illustrating a method of updating a database like for example the database S (32) of FIG. 1. For the following discussion it is assumed without restriction to generality that in the relation T1 to be updated the suffix items form a partial ordered set in the database via a rooted tree, the partial order being formed with respect to the suffix items in non-encrypted form.

The method starts in step S800 in which the client requests any arbitrary current suffix item from the database. In this request the relation is specified. For example, relation S is specified (compare FIG. 1). Preferably, the current suffix item may be the suffix item at the root of the tree.

The request is received by the database in step S802 and in response to said requesting of the current encrypted suffix item, in step S804 the database provides the suffix item to the client. In step S806 the current encrypted suffix item is received and decrypted by the client using the first cryptographic key. Now, the client will compare the current decrypted suffix item with the "update suffix item" to be stored in the database. Depending if the update suffix item is preceding or succeeding the current decrypted suffix item with respect to the partial order, either step S810 or step S812 is following:

In case the update suffix item is located at a position in the partial order preceding the current decrypted suffix item, in step S810 a request is provided to the database for determining the availability of a new encrypted suffix item in the database immediately preceding the current encrypted suffix item.

In case the update suffix item is located at a position in the partial order succeeding the current decrypted suffix item, in step S812 a request is provided to the database for determining the availability of a new encrypted suffix item in the database immediately succeeding the current encrypted suffix item.

In case in step S810 or S812 it turns out that the new encrypted suffix item is available in the database, the method continues with step S814 by defining the current encrypted suffix item being the new encrypted suffix item. Then the method loops back to step S800 with requesting another current suffix item (which in fact is the new encrypted suffix item).

However, in case in step S810 or S812 it turns out that the new encrypted suffix item is unavailable in the database, the method continues with step S816. This means that the current encrypted suffix item forms the leaf of the tree. Consequently, the position at which the encrypted update suffix item is the position "below" said leaf of the tree, i.e. at a depth of the tree which is larger by for example one level than the depth of the leaf describing the current encrypted suffix item.

This is reflected in step S816ff: in case the new encrypted suffix item is unavailable in the database, the update suffix item is encrypted with the first cryptographic key (S816) for obtaining an encrypted update suffix item. Then the storage request is provided to the database (S818), the storage request comprising the encrypted update suffix item and a position information, the position information instructing the database to store the encrypted update suffix item in the database at a position in the partial order immediately preceding or succeeding the position of the current encrypted suffix item, depending if the update suffix item is preceding or succeeding the current decrypted suffix item with respect to the partial order.

LIST OF REFERENCE NUMERALS 10 client
12 processor
14 memory
16 storage medium
17 application
18 symmetric key
19 search criterion
20 relation
22 server
24 cache
26 processor
28 memory
30 database
32 relation
34 relation
48 network
100 computer system
102 trusted environment
104 application program
106 configuration file
108 symmetric keyCryptographic key
110 key identifier
112 database system
114 network
116 database table
118 log-in component
120 assignment information
122 internet session
124 query
126 result
128 memory
130 private key
132 certificate
134 authentication information
136 processor
138 program module
140 program module
142 interface
144 interface
146 processor
148 program module
150 authentication data
152 memory
154 program module
156 program module
158 program module
160 memory
164 network interface
1012 computer system/server
1010 cloud computing node
1014 external services
1016 processing units
1018 bus
1020 network adapter
1022 I/O interfaces
1024 display
1028 memory
1030 random access memory (RAM)
1032 cache memory
1034 storage system
1040 program
1042 program modules,
1050 cloud computing environment
1054A cellular telephone
1054B desktop computer
1054C laptop computer
1054N car

The invention claimed is:

1. A client computer for updating a database stored on a server, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the client computer has installed thereon an application program, the application program being operational to perform the steps of a) receiving an update first data item, the update first data item comprising a set of successional symbols, b) creating an update suffix item by removing a number of the successional symbols from the left side of the update first data item, the update suffix item being the residual part of the update first data item without the removed symbols, c) encrypting the update suffix item with the suffix cryptographic key for obtaining an encrypted update suffix item and encrypting the update first data item with a first cryptographic key for obtaining an encrypted update first data item, d) providing a storage request to the database, the storage request comprising instructions to store in the database the encrypted update suffix item, the encrypted update first data item and a first referential connection assigning said encrypted update suffix item to the encrypted update first data item, e) repeating steps b)-d) with different numbers of the successional removed symbols, the numbers being in between a minimum and a maximum, wherein the maximum is given by the total number of symbols of the update first data item minus a predefined minimal word length.

2. The client computer of claim 1, wherein the suffix items form a partially ordered set in a first relation of the database, the partial order being formed with respect to the suffix items in non-encrypted form, the application program being operational to perform the steps of i. sequentially requesting and decrypting encrypted suffix items, wherein each request of the sequential requesting is performed by comparing the position of the update suffix item in the partial order with the position of the decrypted suffix items in the partial order, wherein the sequential requesting is performed until a position in the partial order for storing the update suffix item in the first relation is determined, ii. in case a position for storing the update suffix item in the first relation is determined, providing the storage request to the database, the storage request comprising the encrypted update suffix item and the position determined in step i).

3. The client computer of claim 2, wherein step i) comprises:

a) requesting a current encrypted suffix item from the database, b) in response to said requesting of the current encrypted suffix item, receiving from the database the current encrypted suffix item, c) decrypting the current encrypted suffix item for obtaining a current decrypted suffix item, d) in case the update suffix item is located at a position in the partial order preceding the current decrypted suffix item, providing a request for determining the availability of a new encrypted suffix item in the first relation immediately preceding the current encrypted suffix item, e) in case the update suffix item is located at a position in the partial order succeeding the current decrypted suffix item, providing a request for determining the availability of a new encrypted suffix item in the first relation immediately succeeding the current encrypted suffix item, f) in case the new encrypted suffix item is available in the first relation, requesting the new encrypted suffix item and in response to said requesting receiving the new encrypted suffix item , and repeating steps c)-f) with the current encrypted suffix item in step c) being the new encrypted suffix item, g) in case the new encrypted suffix item is unavailable in the first relation, encrypting the update suffix item with the first cryptographic key for obtaining an encrypted update suffix item and providing the storage request of step ii) to the server, the storage request comprising the encrypted update suffix item and a position information, the position information instructing the server to store the encrypted update suffix item in the first relation at a position in the partial order immediately preceding or succeeding the position of the current encrypted suffix item, depending if the update suffix item is preceding or succeeding the current decrypted suffix item with respect to the partial order.

4. The client computer of claim 2, wherein step i) comprises:

a) requesting a current encrypted suffix item from the database, b) in response to said requesting of the current encrypted suffix item , receiving from the database the current encrypted suffix item, c) decrypting the current encrypted suffix item for obtaining a current decrypted suffix item, d) providing a request for a new encrypted suffix item, wherein the request for the new encrypted suffix item comprises information that the new encrypted suffix item is to be retrieved from a position in the partial order immediately preceding or succeeding the position of the current encrypted suffix item, depending if the update suffix item is preceding or succeeding the current decrypted suffix item with respect to the partial order, and in response to said provision of the request for the new encrypted suffix item, receiving and decrypting the new encrypted suffix item, e) in case the update suffix item is not located at a position in the partial order between the position of the new decrypted suffix item and the current decrypted suffix item, repeating steps c)-d) with the new encrypted suffix item being the current encrypted suffix item in step c), until the update suffix item is located at a position in the partial order between the position of the new decrypted suffix item and the current decrypted suffix item, f) encrypting the update suffix item with the first cryptographic key for obtaining an encrypted update first data item, wherein step ii) comprises g) providing the storage request to the database, the storage request comprising the encrypted update suffix item and a position information, the position information instructing the database to store the encrypted update suffix item in the first relation at a position in the partial order between the new decrypted suffix item and the current decrypted suffix item.

5. A method for updating a databases stored on a server, the server being coupled to the client computer via the network, wherein the database comprises first data items and suffix items, wherein each suffix item describes a suffix of at least one first data item of the first data items, wherein for each suffix item a first referential connection exists in the database assigning said suffix item to the at least one first data item comprising the suffix of said suffix item, wherein each suffix item is encrypted with a suffix cryptographic key in the database, wherein each first data item is encrypted with a first cryptographic key in the database, wherein the method comprises at the client computer:
- a) receiving an update first data item, the update first data item comprising a set of successional symbols,
- b) creating an update suffix item by removing a number of the successional symbols from the left side of the update first data item, the update suffix item being the residual part of the update first data item without the removed symbols,
- c) encrypting the update suffix item with the suffix cryptographic key for obtaining an encrypted update suffix item and encrypting the update first data item with a first cryptographic key for obtaining an encrypted update first data item,
- d) providing a storage request to the database, the storage request comprising instructions to store in the database the encrypted update suffix item, the encrypted update first data item and a first referential connection assigning said encrypted update suffix item to the encrypted update first data item,
- e) repeating steps b)-d) with different numbers of the successional removed symbols, the numbers being in between a minimum and a maximum, wherein the maximum is given by the word length of the update first data item minus a predefined minimal word length.

\* \* \* \* \*